United States Patent
Ko et al.

(10) Patent No.: US 11,568,310 B2
(45) Date of Patent: *Jan. 31, 2023

(54) APPARATUS FOR GENERATING TEMPERATURE PREDICTION MODEL AND METHOD FOR PROVIDING SIMULATION ENVIRONMENT

(71) Applicant: LG ELECTRONICS INC., Seoul (KR)

(72) Inventors: Hangyu Ko, Seoul (KR); Bongsang Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 612 days.

This patent is subject to a terminal disclaimer.

(21) Appl. No.: 16/492,899

(22) PCT Filed: Jun. 4, 2019

(86) PCT No.: PCT/KR2019/006748
§ 371 (c)(1),
(2) Date: Sep. 10, 2019

(87) PCT Pub. No.: WO2020/246631
PCT Pub. Date: Dec. 10, 2020

(65) Prior Publication Data
US 2021/0190362 A1 Jun. 24, 2021

(51) Int. Cl.
*G05D 23/00* (2006.01)
*G06N 20/00* (2019.01)
(Continued)

(52) U.S. Cl.
CPC .............. *G06N 20/00* (2019.01); *F24F 11/30* (2018.01); *F24F 11/63* (2018.01);
(Continued)

(58) Field of Classification Search
CPC .... F24F 11/63; F24F 2120/20; F24F 2110/10; G06N 20/00; G06N 3/08; G06N 7/005;
(Continued)

(56) References Cited

U.S. PATENT DOCUMENTS

2006/0003303 A1* 1/2006 Almond ................... G09B 7/02
434/118
2009/0326884 A1 12/2009 Amemiya et al.
(Continued)

FOREIGN PATENT DOCUMENTS

JP 2012-149839 A 8/2012
KR 10-2017-0028721 A 3/2017
(Continued)

*Primary Examiner* — Tuan A Vu
(74) *Attorney, Agent, or Firm* — Birch, Stewart, Kolasch & Birch, LLP

(57) ABSTRACT

An apparatus for generating a temperature prediction model is disclosed. The apparatus for generating a temperature prediction model includes the temperature prediction model configured to provide a simulation environment, and a processor configured to set a hyperparameter of the temperature prediction model, train the temperature prediction model, in which the hyperparameter is set, so that the temperature prediction model, in which the hyperparameter is set, outputs a predicted temperature, update the hyperparameter on the basis of a difference between the predicted temperature, which is outputted from the trained temperature prediction model, and an actual temperature, and repeat the setting of the hyperparameter, the training of the temperature prediction model, and the updating of the hyperparameter on the basis of the difference between the predicted temperature and the actual temperature by a predetermined number of times or more to set a final hyperparameter of the temperature prediction model.

16 Claims, 14 Drawing Sheets

(51) Int. Cl.
*F24F 11/63* (2018.01)
*F24F 11/30* (2018.01)
*G06K 9/62* (2022.01)
*G06N 3/08* (2006.01)
*G06N 7/00* (2006.01)
*G06F 11/36* (2006.01)
*F24F 120/20* (2018.01)
*F24F 110/10* (2018.01)
*G06F 16/2457* (2019.01)
*G06N 3/04* (2006.01)
*G09B 7/02* (2006.01)

(52) U.S. Cl.
CPC ........ *G06F 11/3688* (2013.01); *G06K 9/6256* (2013.01); *G06N 3/08* (2013.01); *G06N 7/005* (2013.01); *F24F 2110/10* (2018.01); *F24F 2120/20* (2018.01); *G06F 16/24578* (2019.01); *G06N 3/04* (2013.01); *G09B 7/02* (2013.01)

(58) Field of Classification Search
CPC ...... G06N 3/04; G06N 3/0445; G06K 9/6256; G06K 9/6262; G06F 16/285; G06F 30/23; G06F 11/3688; G06F 16/24578; G09B 7/02

See application file for complete search history.

(56) References Cited

U.S. PATENT DOCUMENTS

| | | | |
|---|---|---|---|
| 2018/0025288 A1* | 1/2018 | Piche | G06F 30/23 |
| | | | 706/46 |
| 2018/0240041 A1* | 8/2018 | Koch | G06F 16/24578 |
| 2020/0012900 A1* | 1/2020 | Walters | G06F 11/3688 |
| 2020/0012935 A1* | 1/2020 | Goodsitt | G06F 16/285 |
| 2020/0143240 A1* | 5/2020 | Baker | G06N 3/04 |
| 2020/0175378 A1* | 6/2020 | McDonnell | G06N 3/04 |
| 2020/0356839 A1* | 11/2020 | Tocornal | G06K 9/6262 |
| 2020/0356857 A1* | 11/2020 | Lee | G06N 3/0445 |

FOREIGN PATENT DOCUMENTS

| | | |
|---|---|---|
| KR | 10-2018-0082934 A | 7/2018 |
| KR | 10-2019-0048895 A | 5/2019 |

* cited by examiner

APPARATUS FOR GENERATING TEMPERATURE PREDICTION MODEL AND METHOD FOR PROVIDING SIMULATION ENVIRONMENT

CROSS REFERENCE TO RELATED APPLICATION

This application is the National Phase of PCT International Application No. PCT/KR2019/006748, filed on Jun. 4, 2019, which is hereby expressly incorporated by reference into the present application.

TECHNICAL FIELD

The present invention relates to an apparatus for generating a temperature prediction model by setting an optimum hyperparameter and a method for providing a simulation environment.

BACKGROUND ART

Artificial intelligence is a field of computer engineering and information technology involving studying how computers can think, learn and self-develop in ways similar to human intelligence, and means that computers can emulate intelligent actions of humans.

In addition, artificial intelligence does not exist by itself but is directly or indirectly associated with the other fields of computer science. In particular, many attempts have been made to introduce elements of artificial intelligence into various fields of information technology.

The temperature prediction model may be a temperature prediction simulator that predicts how a temperature will change when a control value is set and may provide a simulation environment for various devices that require temperature prediction.

However, since the temperature is determined by very various variables such as performance of an air conditioner, performance of a valve, information of building (a structure of the building, a material of the building, the number of windows, a thickness of a wall, and the like), season, date, time, and the like, it may be difficult to generate a simulator that reflects the various variables.

Existing indoor temperature simulators are implemented in such a way in which equations for predicting the temperature change of the building are updated by reflecting specifications of at least the air conditioner and additional building information such as the material of the building, the number of windows, and the like.

As described above, in a method for updating equations by expressing a relationship between the variables and the temperature as the equations, due to the complexity, when the number of variables increases, it may be impossible to update the equations, and thus, there is a problem that accuracy of prediction is deteriorated.

Also, since humans check a difference between the actual temperature data and the simulated temperature data and update the equation depending on human intuition, it is difficult to derive the optimal equation.

DISCLOSURE OF THE INVENTION

Technical Problem

The present invention relates to an apparatus for generating a temperature prediction model by setting an optimum hyperparameter and a method for providing a simulation environment.

Technical Solution

An apparatus for generating a temperature prediction model according to an embodiment of the present invention includes the temperature prediction model configured to provide a simulation environment; and a processor configured to set a hyperparameter of the temperature prediction model, train the temperature prediction model, in which the hyperparameter is set, so that the temperature prediction model, in which the hyperparameter is set, outputs a predicted temperature, update the hyperparameter on the basis of a difference between the predicted temperature, which is outputted from the trained temperature prediction model, and an actual temperature, and repeat the setting of the hyperparameter, the training of the temperature prediction model, and the updating of the hyperparameter on the basis of the difference between the predicted temperature and the actual temperature by a predetermined number of times or more to set a final hyperparameter of the temperature prediction model.

Advantageous Effects

It may be very difficult to search the hyperparameters that show the optimal simulation results, and when searching for hyperparameters based on the human intuition, it may be difficult to derive the optimal hyperparameter. However, according to the present invention, since the apparatus for generating the temperature prediction model updates the hyperparameter by comparing the predicted temperature to the actual temperature of the temperature prediction model, there may be the advantage of deriving the optimal hyperparameter.

Also, according to the present invention, when the human provides only the control information and the actual temperature information at the specific place, the hyperparameters and model parameters of the temperature prediction model may be optimized by the apparatus for generating the temperature prediction model. Thus, there may be the advantage of significantly saving the time and effort while improving the accuracy of the temperature prediction model.

Also, according to the related art, the temperature prediction model may be generated by updating the equation indicating the relationship between the variables and the temperature. However, according to the present invention, the temperature change pattern itself, which depends on the variables (the performance of the air conditioner, the performance of the valve, the information of building (the structure of the building, the material of the building, the number of windows, the thickness of the wall, and the like). Therefore, according to the present invention, all the variables (the performance of the air conditioner, the performance of the valve, the information of building (the structure of the building, the material of the building, the number of windows, the thickness of the wall, and the like) may be reflected to improve the accuracy of the prediction.

In addition, according to the present invention, in the state in which some elements of the hyperparameters are fixed by the user's setting, the optimal value for some other elements may be derived. Thus, there may be the advantage that is capable of being optimized by specifying only the elements that are required by the user. For example, the user may set some elements of the hyperparameters as the fixed values depending on the intuition or the design convenience, and some of the other elements of the hyperparameter may be utilized for the apparatus for generating the temperature prediction model in the optimized manner.

MODE FOR CARRYING OUT THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that if an element is referred to as being "connected with" or "coupled to" another element, the element can be directly connected with the other element or intervening elements may also be present. In contrast, if an element is referred to as being "directly connected with" or "directly coupled to" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
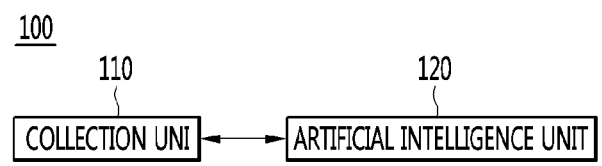
FIG. 1 is a block diagram illustrating an artificial intelligence device according to an embodiment of the present invention.

FIG. 1 is a block diagram illustrating an artificial intelligence device according to an embodiment of the present invention.

In the present invention, the term automatic control artificial intelligence device may be used interchangeably with the term artificial intelligence device.

The artificial intelligence device 100 according to the embodiment of the present invention may provide a control function to a control system.

The control system may mean all systems for collecting a current value, outputting a control value using the collected current value, a set value and a control function and performing control according to the output control value, such as an air conditioning system, an energy management system, a motor control system, an inverter control system, a pressure control system, a flow rate control system, a cooling/heating system, etc.

For example, in the air conditioning system, the current value may be a current temperature (that is, an output value according to existing valve control) and the set value may be a target temperature. In addition, an error between the current value and the set value may be input to a control function and the control function may calculate and provide a control value to the air conditioning system. In this case, the air conditioning system may perform control according to the control value, that is, may open a valve according to the control value.

As another example, in the energy management system, the current value may be a current charge amount (that is, an output value according to existing charge amount control) and the set value may be a target change amount. In addition, an error between the current value and the set value may be input to a control function, and the control function may calculate and provide a control value to the energy management system. In this case, the energy management system may perform control according to the control value, that is, may control the charge amount according to the control value.

As another example, in the motor control system, the current value may be a current motor speed (that is, an output value according to existing speed control) and the set value may be a target motor speed. In addition, an error between the current value and the set value may be input to a control function, and the control function may calculate and provide a control value to the motor control system. In this case, the motor control system may perform control according to the control value, that is, may control the motor speed according to the control value.

Meanwhile, the artificial intelligence device may include a collection unit 110 and an artificial intelligence unit 120.

The collection unit 110 may acquire an output value according to control of a control system. Here, the output value according to control of the control system may mean a state in which an object to be controlled by the control system is controlled by the control system.

For example, the object to be controlled by the air conditioning system may be a temperature and the output value according to control of the control system may mean a temperature obtained or changed by temperature control of the air conditioning system.

As another example, the object to be controlled by the motor control system may be the speed of the motor and the output value according to control of the control system may mean the speed of the motor obtained or changed by speed control of the motor control system.

The output value according to control of the control system may be used as a current value. That is, a feedback control loop may be configured by setting the output value of the control system as the current value and inputting the error between the current value and the set value to the control function again.

The output value may be directly sensed by the artificial intelligence device or received from another system or device.

Specifically, the collection unit 110 may include a sensing unit for sensing the output value according to control of the control system.

For example, when the object to be controlled is a temperature, the collection unit 110 may include a temperature sensor and, when the object to be controlled is pressure, the collection unit 110 may include a pressure sensor.

When the artificial intelligence device 100 and the control system are separately configured, the control system may sense the output value, and the collection unit 110 of the artificial intelligence device 100 may receive the output value from the control system. In this case, the collection unit 110 may include a communication unit for communicating with the control system.

Even when the artificial intelligence device 100 and the control system are separately configured, in addition to the control system sensing the output value, the collection unit 110 may also sense the output value.

Although not shown, the artificial intelligence device 100 may include a storage unit. A control function, a pattern of an output value, an application program for reinforcement learning, an application program for learning time-series data using a recurrent neural network, etc. may be stored in the storage unit.

The control method of the control system will be briefly described.

Meanwhile, the control function updated in the present invention may be a control function of feedback control, which includes one or more parameters.

Terms used in the present invention will be described using the PID control function of Equation 1, for example.

$$u(t) = K_p e(t) + K_i \int_0^t e(\tau)d\tau + K_d \frac{de(t)}{dt} \qquad \text{[Equation 1]}$$

PID control is a control loop feedback mechanism widely used in an industrial control system.

PID control is a combination of proportional control, integral control and derivative control, which acquires a current value of an object to be controlled, compares the current value with a set point (SP), calculates an error e(t) and calculates a control value (CV) u(t) necessary for control using the error.

For example, in a heating system, the current value is a current temperature, the set point (SP) is a target temperature, and the error e(t) may be a difference between the current temperature and the target temperature.

Meanwhile, in PID control, the control value ((CV) u(t) may be calculated by a PID control function including a proportional term $K_p e(t)$, an integral term and a derivative term $$K_i \int_0^t e(\tau)d\tau.$$

In this case, the proportional term $K_p e(t)$ is proportional to the error e(t), the integral term $$K_i \int_0^t e(\tau)d\tau$$

is proportional to the integral of the error e(t), and the derivative term $$K_d \frac{de(t)}{dt}$$

is proportional to the derivative of the error e(t).

In addition, the proportional term, the integral term and the derivative term may include a proportional gain parameter $K_p$ which is gain of the proportional term, an integral gain parameter $K_i$ which is gain of the integral term and a derivative gain parameter $K_d$ which is gain of the derivative term, respectively.

The PID parameters of the gains of the terms included in the PID function. That is, the PID parameter may include the proportional gain parameter $K_p$, the integral gain parameter $K_i$ and the derivative gain parameter $K_d$.

Output of the PID controller is the control value (CV) u(t), and the control value (CV) u(t) may be used as input of the control system. In other words, the control value (CV) u(t) may mean a manipulated variable (MV).

In addition, the control system may perform control corresponding to the control value (CV) u(t).

For example, in a heating system, when the control value (CV) u(t) of 80% is output by the control function, the heating system may perform control corresponding to the control value (CV) u(t) of 80%, that is, control for opening a valve by 80%.

Meanwhile, the output value according to control of the control system may mean a state in which an object to be controlled by the control system is controlled by the control system. That is, the output value may mean a process variable (PV).

For example, in the heating system, the object to be controlled is a temperature and the output value may mean a temperature maintained or changed by control of the heating system.

Meanwhile, the control system senses the output value and use the output value as the current value. In this manner, a control loop is formed and control is performed by a feedback mechanism.

Meanwhile, the artificial intelligence unit 120 may update a control function for providing a control value to the control system based on reinforcement learning.

Reinforcement Learning is the theory that an agent can find a best way with experience thereof without data if an environment in which the agent can determine what action to take every moment is given.

Reinforcement Learning may be performed by a Markov Decision Process (MDP).

The Markov Decision Process (MDP) will be briefly described. First, an environment including information necessary for the agent to take a next action is given. Second, what action is taken by the agent in that environment is defined. Third, a reward given to the agent when the agent successfully takes a certain action and a penalty given to the agent when the agent fails to take a certain action are defined. Fourth, experience is repeated until a future reward reaches a maximum point, thereby deriving an optimal action policy.

The Markov Decision Process (MDP) is applicable to the artificial intelligence unit 120 according to the embodiment of the present invention.

Specifically, first, an environment in which the output value or the pattern of the output value is provided is given to the artificial intelligence unit 120, such that the artificial intelligence unit 120 updates the control function. Second, action of the artificial intelligence unit 120 is defined such that the output value follows the base line in order to achieve a goal. Third, a reward is given as the artificial intelligence unit follows the base line. Fourth, the artificial intelligence unit 120 repeats learning until the sum of reward is maximized, thereby deriving an optimal control function.

In this case, the artificial intelligence unit 120 may update the feedback control function based on the output value according to the control function.

Specifically, when the control system performs control corresponding to the control value received from the control function, the artificial intelligence unit 120 may update one or more parameters of the feedback control function such that a goal is achieved through the output value according to control of the control system.

The artificial intelligence unit 120 takes an action of changing the parameter of the control function, acquires the state (output value) and the reward according to the action and acquire a policy for maximizing the reward.

In this case, the goal achieved by the artificial intelligence unit 120 may be set by a point at which the reward is given, the magnitude of the reward, etc.

The artificial intelligence unit 120 may variously change the parameter of the control function using a try-and-error method. When the output value is acquired according to the control function having the changed parameter, the reward may be given to the acquired output value, thereby acquiring a policy for maximizing the reward.

Meanwhile, a best policy achieved by the artificial intelligence unit 120 is preset by reinforcement learning and, when the artificial intelligence unit 120 takes an action to follow the beast policy, the amount of learning of the artificial intelligence unit 120 can be significantly reduced.

Accordingly, in the present invention, it is possible to preset the best policy achieved by the artificial intelligence unit 120 by reinforcement learning.

In this case, the best policy achieved by the artificial intelligence unit 120 may mean ideal change of the output value according to control of the control system.

Here, the ideal change of the output value according to control of the control system may be referred to as a base line.

The artificial intelligence unit 120 may update the control function for providing the control value to the control system, such that the output value according to control of the control system follows the base line.

This will be described in detail with reference to FIG. 2.

Figure 2:
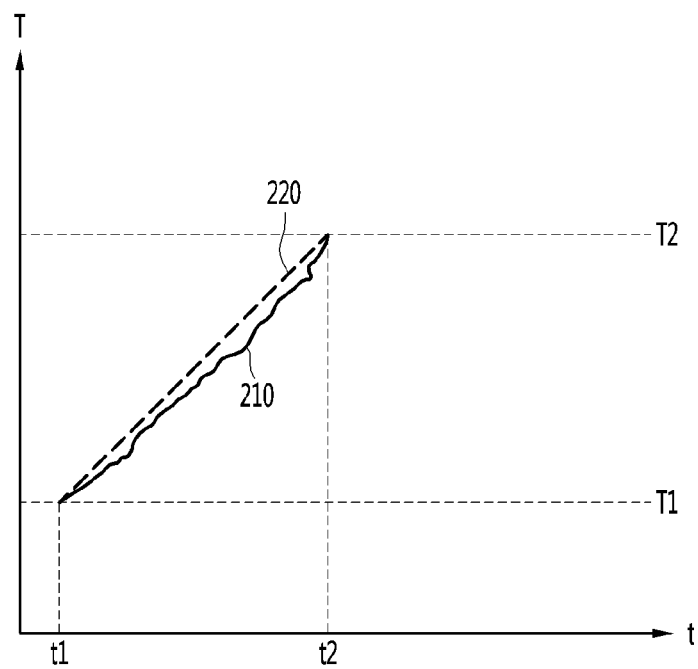
FIG. 2 is a diagram illustrating a method of setting a base line according to an embodiment of the present invention.

FIG. 2 is a diagram illustrating a method of setting a base line according to an embodiment of the present invention.

The base line may include a first line indicating change in output value according to maximum control of the control system.

Specifically, the first line may indicate change in output value obtained when the control system performs maximum control according to the maximum control value of the control function.

For example, in the heating system, when a maximum control value of 100% is output by the control function, the heating system may perform control corresponding to the control value of 100%, that is, control of opening the valve by 100%.

In this case, the first line may mean change in temperature, which is the object to be controlled, when the valve is opened by 100%.

Meanwhile, change 210 in output value according to maximum control of the control system may be the first line.

The present invention is not limited thereto and the average rate 220 of change of the output value according to maximum control of the control system may be the first line.

For example, when the heating system starts operation at a first temperature T1 at a first point of time t1 and performs maximum control to reach a second temperature T2 at a second point of time t2, the first line may indicate the average rate of change of the temperature from the first point of time t1 to the second point of time t2.

Meanwhile, the artificial intelligence unit 120 may set the first line in an environment in which the control system is installed.

Specifically, the artificial intelligence unit 120 may control the control system such that the control system performs maximum control in the environment in which the control system is installed.

For example, if the control system is a valve system for supplying water for heating to the pipe of a specific room of a building, the artificial intelligence device 120 may control the valve system for supplying water for heating to the pipe of the specific room to maximally open the valve.

If the artificial intelligence device 100 and the control system are separately configured, the artificial intelligence unit 120 may transmit a control command for instructing the control system to perform maximum control to the control system.

In contrast, if the artificial intelligence device 100 and the control system are integrally configured, the artificial intelligence unit 120 may directly control an operation unit to perform maximum control.

Meanwhile, while the control system performs maximum control, the artificial intelligence unit 120 may acquire the output value according to maximum control of the control system. In addition, the artificial intelligence unit 120 may set the first line based on the acquired output value.

Figure 3:
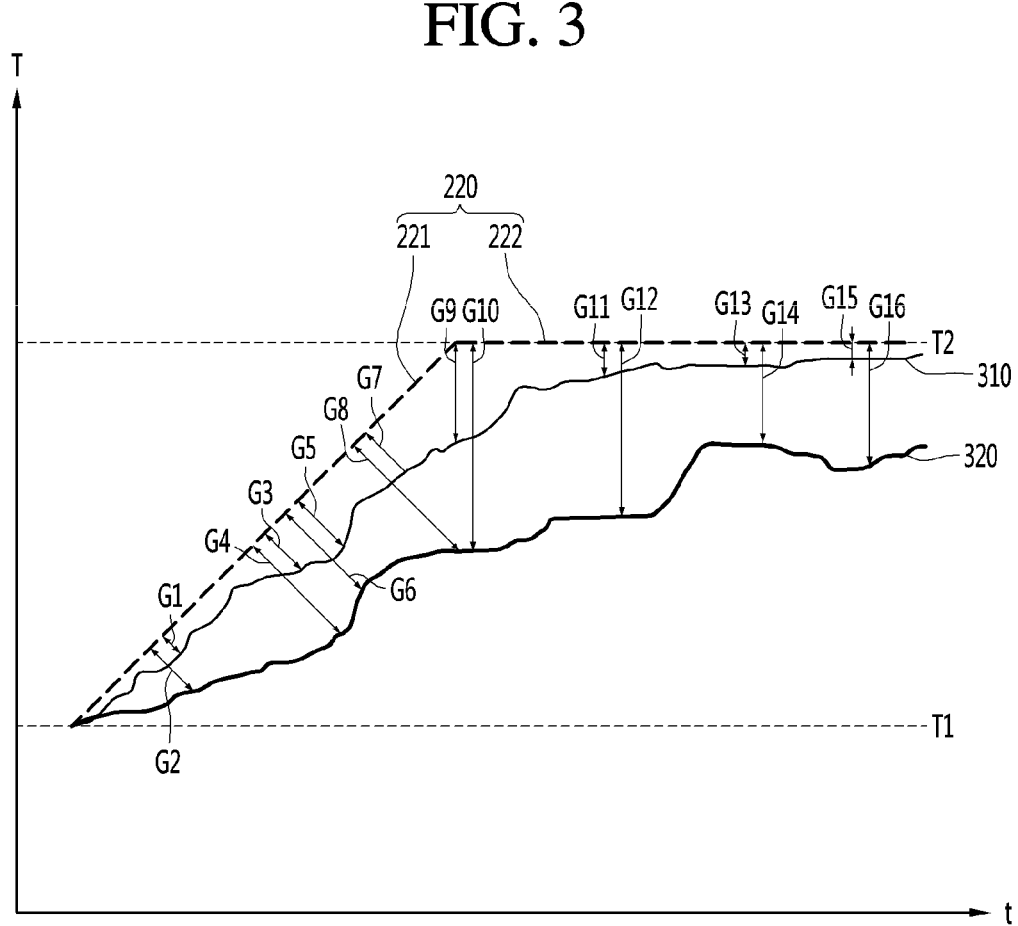
FIG. 3 is a diagram illustrating a method of performing reinforcement learning such that a second line and an artificial intelligence unit follow a base line according to an embodiment of the present invention.

FIG. 3 is a diagram illustrating a method of performing reinforcement learning such that a second line and an artificial intelligence unit follow a base line according to an embodiment of the present invention.

The first line 221 of the base line 220 means change in output value according to maximum control of the control system as described with reference to FIG. 2.

Here, setting the first line 221 may serve to provide artificial intelligence unit 120 with a goal of rapidly reaching a set value.

The base line 220 may further include a second line 222.

Setting the second line 222 may serve to provide the artificial intelligence unit 120 with a goal of reducing overshoot of the output value or fluctuation of the output value above or below the set value after reaching the set value.

Accordingly, the second line 222 may match the set value. Here, the set value may be a target value of the output value when specific operation is performed.

For example, when the current temperature is 24° C. and a command for increasing the temperature to 30° C. is received, the control system may perform operation for increasing the temperature to 30° C. In this case, the artificial intelligence unit 120 may set the base line including the first line indicating the average rate of change of the temperature when the control system performs maximum control and the second line for increasing the temperature to 30° C.

As another example, when the current temperature is 24° C. and a command for increasing the temperature to 27° C. is received, the control system may perform operation for increasing the temperature to 27° C. In this case, the artificial intelligence unit 120 may set the base line including the first line indicating the average rate of change of the temperature when the control system performs maximum control and the second line for increasing the temperature to 27° C.

Meanwhile, the artificial intelligence unit 120 may perform reinforcement learning such that the output value according to control of the control system follows the base line 220.

Here, following the base line may mean that the output value according to control of the control system most closely approaches the base line 22.

In addition, the artificial intelligence unit 120 may perform reinforcement learning such that the output value according to control of the control system follows the base line 220, thereby acquiring one or more parameters of the control function.

Specifically, the artificial intelligence unit 120 may acquire output values 310 and 320 while variously changing the parameters of the control function in a try and error manner.

In addition, the artificial intelligence unit 120 gives a reward based on a gap between the base line 220 and the output value, thereby acquiring one or more parameters for enabling the output value according to control of the control system to most closely follow the base line 220.

Specifically, the artificial intelligence unit 120 may calculate a gap between the base line 220 and the output at one or more points or all points.

As the gap between the base line 220 and the output value is decreased, the given reward may be increased. The artificial intelligence unit 120 may acquire one or more parameters for maximizing the reward.

For example, assume that the output value obtained when the control system performs control according to the control value of the control function including a first parameter is a first output 310 and the output value obtained when the control system performs control according to the control value of the control function including a second parameter is a second output 320.

Gaps G1, G3, G5, G7, G9, G11, G13 and G15 between the first output value 310 and the base line 220 are smaller than gaps G2, G4, G6, G8, G10, G12, G14 and G16 between the second output value 320 and the base line 220.

That is, the reward given when the first parameter is used is greater than the reward given when the second parameter is used. In this case, the artificial intelligence unit 120 may acquire the first parameter as the parameter for enabling the output value to most closely follow the base line.

In this manner, the artificial intelligence unit 120 may continuously perform reinforcement learning, thereby acquiring the parameter for enabling the output value according to control of the control system to most closely follow the base line.

When a new parameter for enabling the output value according to control of the control system to most closely follow the base line is acquired, the artificial intelligence unit 120 may change the parameter of the existing control function to the newly acquired parameter, thereby updating the existing control function.

Meanwhile, the gaps G1, G3, G5, G7, G9, G11, G13 and G15 shown in FIG. 3 indicate the distances between the output value and the base line at several points and are merely exemplary.

For example, the gap between the output value and the base line may mean the area of a space between the output value and the base line.

That is, the area of the space between the first output value 310 and the base line 220 when the first parameter is used may be smaller than that of the space between the second output value 320 and the base line 220 when the second parameter is used. In this case, a reward given when the first parameter is greater than a reward given when the second parameter is used. The artificial intelligence unit 120 may acquire the first parameter as the parameter for enabling the output value to most closely follow the base line.

That is, the gap described in this specification may mean a difference between the base line and the output value.

The output value according to control of the control system is not determined only by control of the control system but is determined by various variables.

For example, in the heating system, the output value according to control of the control system is determined by various variables such as season, weather, time, date, the area of a space, whether a window is opened, the number of persons in a space, whether a door is opened, whether an insulator is used, etc.

Since it is impossible for humans to analyze various variables to calculate an optimal parameter, a PID parameter has been directly set by humans based on human experience and intuition. As a similar example, in baduk where there are a large number of cases, baduk players find moves based on experience and intuition thereof.

However, the present invention is advantageous in that a learning environment is provided to an artificial intelligence agent and the artificial intelligence agent learns a large amount of data, thereby calculating an optimal parameter regardless of various variables for determining the output value. As a similar example, in baduk where there are a large number of cases, an artificial intelligence agent learns the record of baduk to find optimal moves.

In an operating environment of the control system, in which there are various variables and a set value may be changed whenever operation is performed, how to set the goal of the artificial intelligence agent may come into question.

However, the present invention is advantageous in that a clear goal of following the base line is given to the artificial intelligence agent and the artificial intelligence agent performs learning such that the gap between the base line and the output value is minimized, thereby improving learning ability and learning speed of the artificial intelligence agent.

In addition, the first line of the base line indicates the output value according to maximum control of the control system and the second line of the base line indicates the set value of specific operation. Accordingly, according to the present invention, a goal of rapidly reaching a set value and a goal of stabilizing a system such as reduction of overshoot or fluctuation of an output value are simultaneously given to the artificial intelligence agent.

In addition, even when the same control system performs the same operation, the output value may be changed according to a place where the control system is installed.

For example, even when the valve of a heating system installed Thailand having a hot climate and the valve of a heating system installed in Russia having a cold climate are equally opened by 80%, the average rate of change of the output value in Thailand and the average rate of change of the output value in Russia may be different.

As another example, the average rate of change of the output value in a first building with good insulation and the average rate of change of the output value in a second building with poor insulation may be different from each other.

However, the first line of the present invention is set based on the output value by maximum control in an environment in which the control system is installed. That is, the first line is set according to the characteristics of the environment in which the control system is installed and the artificial intelligence agent performs reinforcement learning in order to follow the first line. Therefore, according to the present invention, it is possible to find an optimal control function suitable for an environment in which the control system is installed.

Meanwhile, the artificial intelligence unit according to the present invention may set at least one of one or more base lines and a reward based on a gap between the one or more base lines and an output value, according to a plurality of operation goals of a control system, and perform reinforcement learning based on the gap between the one or more base lines and the output value.

Here, the plurality of operation goals of the control system may include at least one of a goal that an output value rapidly reaches a set value, a goal of reducing fluctuation of the output value, a goal of reducing overshoot of the output value, a goal that the output value follows and a goal that the output value avoids.

First, a method of setting a reward based on a gap between one or more base lines and an output value, according to a plurality of operation goals of a control system, and performing reinforcement learning will be described.

Figure 4:
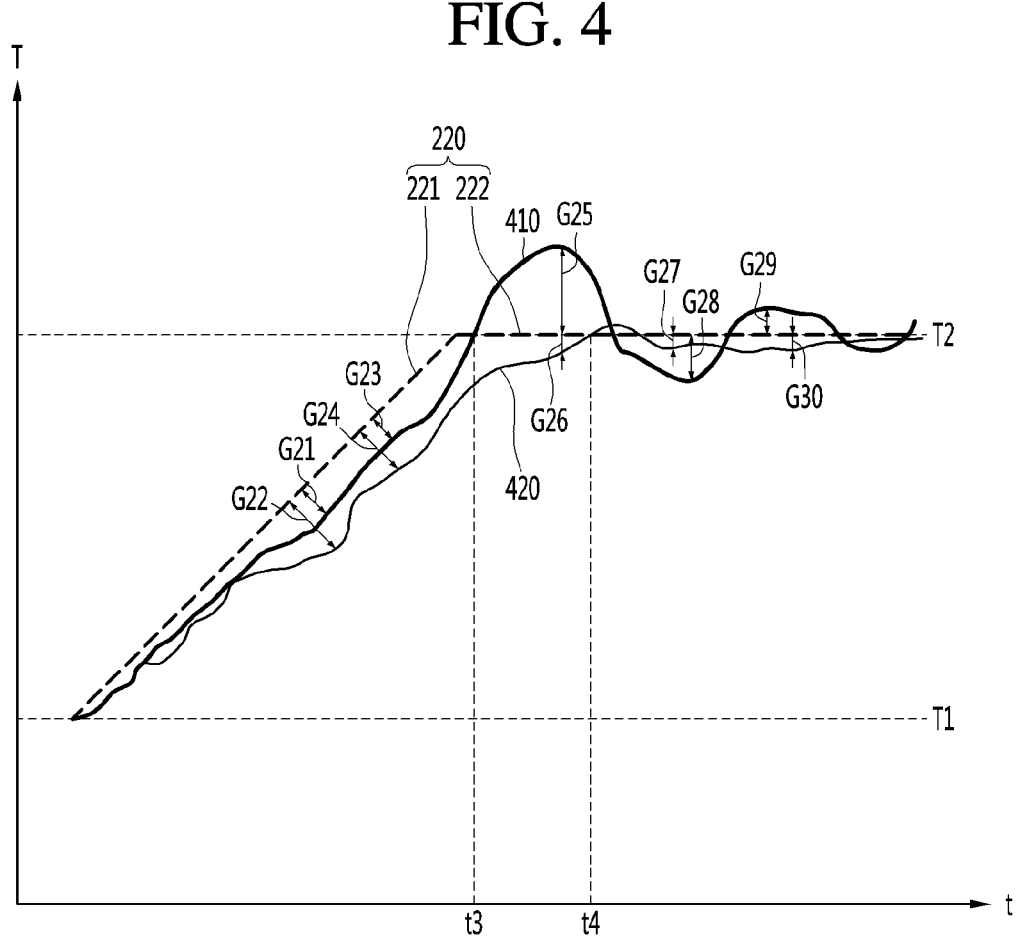
FIG. 4 is a diagram illustrating a method of giving different rewards according to the position of a gap according to an embodiment of the present invention.

FIG. 4 is a diagram illustrating a method of giving different rewards according to the position of a gap according to an embodiment of the present invention.

The artificial intelligence unit 120 may set a reward based on a gap between one or more base lines and an output value, according to a plurality of operation goals of a control system.

For example, the artificial intelligence unit 120 may set a base line 220 according to a goal that the output value follows, set a reward based on a gap between a first line 221 and the output value, according to a goal that the output value rapidly reaches a set value, and set a reward based on a gap between a second line 222 and the output value, according to a goal of reducing overshoot and fluctuation of the output value.

In this case, the artificial intelligence unit 120 may give different rewards according to the position of the gap between the base line and the output value.

Specifically, the artificial intelligence unit 120 may give a first reward based on the gap between the first line 221 and the output value and give a second reward based on the gap between the second line 222 and the output value. In this case, the first reward and the second reward may be different from each other.

For example, assume that the output value obtained when the control system performs control according to the control value of the control function including the first parameter is a first output value 410 and the first reward is greater than the second reward.

The gaps G21, G23, G25, G27 and G29 between the base line 220 and the first output value 410 may include gaps G21 and G23 between the first line 221 and the first output value 410 and the gaps G25, G27 and G29 between the second line 222 and the first output value 410.

Meanwhile, the first reward is given as the gaps G21 and G23 between the first line 221 and the first output value 410 are small and the second reward is given when the gaps G25, G27 and G29 between the second line 222 and the first output value 410 are small. In addition, the first reward may be greater than the second reward.

For example, when the first gap G21 between the first line 221 and the first output value 410 is 10 and the second gap G29 between the second line 222 and the first output value 410 is 10, a reward of 5 may be given to the first gap G21 and a reward of 2 may be given to the second gap G29.

Accordingly, when an optimal control function following the base line in a state in which the first reward is greater than the second reward is acquired, the output value according to the optimal control function may be closer to the first line 221 than the second line 222. That is, the gap between the output value according to the optimal control function and the first line 221 may be less than the gap between the output value according to the optimal control function and the second line 222.

For example, if it is assumed that the output value according to the optimal control function is a first output value 410 when the first reward is greater than the second reward, the first output value 410 may be closer to the first line 221 than the second line 222.

In contrast, assume that the output value obtained when the control system performs control according to the control value of the control function including the second parameter is a second output value 420 and the first reward is less than the second reward.

The gaps G22, G24, G26, G28 and G30 between the base line 220 and the second output value 420 may include the gaps G22 and G24 between the first line 221 and the second output value 420 and the gaps G26, G28 and G30 between the second line 222 and the second output value 420.

Meanwhile, the first reward is given as the gaps G22 and G24 between the first line 221 and the second output value 420 are small and the second reward is given as the gaps G26, G28 and G30 between the second line 222 and the second output value 420 is small. In addition, the first reward may be less than the second reward.

For example, when the first gap G22 between the first line 221 and the first output value 420 is 10 and the second gap G28 between the second line 222 and the first output value 420 is 10, a reward of 2 may be given to the first gap G22 and a reward of 4 may be given to the second gap G28.

Accordingly, when an optimal control function following the base line in a state in which the first reward is less than the second reward is acquired, the output value according to the optimal control function may be closer to the second line 222 than the first line 221. That is, the gap between the output value according to the optimal control functio221111n and the second line 222 may be less than the gap between the output value according to the optimal control function and the first line 221.

For example, if it is assumed that the output value according to the optimal control function is the second output value 420 when the first reward is less than the second reward, the second output value 420 may be closer to the second line 222 than the first line 221.

As described above, setting the first line may serve to provide the artificial intelligence unit 120 with a goal of rapidly reaching the set value to and setting the second line 222 may serve to provide the artificial intelligence unit 120 with a goal of reducing overshoot of the output value or fluctuation of the output value above or below the set value after reaching the set value.

That is, in the present invention, after weighting various operational goals in a manner of giving different rewards according to the position of the gap, the artificial intelligence agent may find an optimal parameter according to the weighted operational goals.

For example, referring to the first output value 410, when a greater reward is given to the gap between the first line 221 and the output value, a point of time t3 when the output value reaches the set value may be advanced but overshoot may be increased or fluctuation of the output value above or below the set value may be increased. Accordingly, this may be advantageous in terms of rapid control to the set value but may be disadvantageous in terms of power consumption and system stabilization.

For example, referring to the second output value 420, when a greater reward is given to the gap between the second line 222 and the output value, a point of time t4 when the output value reaches the set value may be delayed and overshoot may be decreased or fluctuation of the output value above or below the set value may be decreased. Accordingly, this may be disadvantageous in terms of rapid control to the set value but may be advantageous in terms of power consumption and system stabilization.

That is, the present invention is advantageous in that the reward is changed according to the position of the gap to variously combine various operational goals according to a degree of importance and to acquire an optimal parameter.

Although different rewards are given to the gap between the first line and the output value and the gap between the second line and the output value in the above description, the present invention is not limited thereto and the magnitude of the reward may be variously changed according to the operational goal.

For example, when desiring to give a high weight to an operational goal of minimizing overshoot, a greater reward may be given to the gap G25 at the position where overshoot occurs with the base line 220 than the other gaps G27 and G29.

As another example, when desiring to give a high weight to a goal of reducing fluctuation of the output value above or below the set value to rapidly stabilize the system, a greater reward may be given to the gaps G27 and G29 at the position where the output value fluctuates above or below than the set value than the gap G25.

Figure 5:
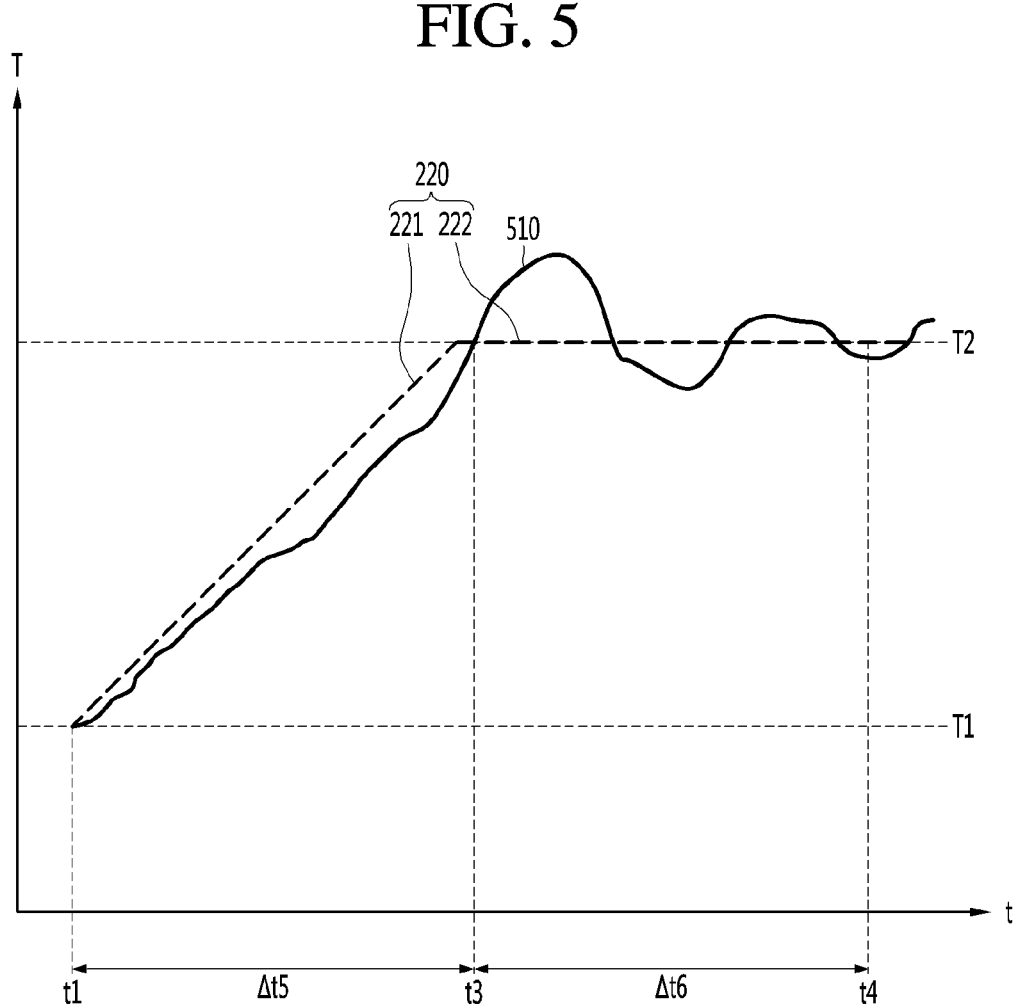
FIG. 5 is a diagram illustrating a comparison range between a base line and an output line according to an embodiment of the present invention.

FIG. 5 is a diagram illustrating a comparison range between a base line and an output line according to an embodiment of the present invention.

The artificial intelligence unit 120 may perform reinforcement learning such that the output value 510 according to control of the control system follows the base line 220.

In this case, the artificial intelligence unit 120 may perform reinforcement learning such that an output value 510 follows a first line 221 until the output value 510 reaches a set value T2 and follows the second line 222 after the output value 510 reaches the set value T2.

Meanwhile, a time from a point of time t1 when the control system starts to operate to a point of time t3 when the output value 510 reaches the set value T2 is referred to as a first time Δt5.

The artificial intelligence unit 120 may perform reinforcement learning such that the output value 510 follows the first line 221 for the first time Δt5 until the output value 510 reaches the set value T2 and the output value follows the second line 222 for a second time Δt6 after the output value 510 reaches the set value T2.

That is, the artificial intelligence unit 120 may perform reinforcement learning by giving a reward to the gap between the output value 510 and the base line 220 for the first time Δt5 and the second time Δt6.

In this case, the first time Δt5 and the second time Δt6 may be proportional by the following equation. Here, α may be a proportional constant.

Second time=α*first time  [Equation 2]

For example, if the proportional constant is 1 and the first time from the point of time when the control system starts to operate to the point of time when the output value reaches the set value is 2 minutes, the artificial intelligence unit 120 may perform reinforcement learning such that the output value follows the first line 221 for 2 minutes until the output value reaches the set value and the output value follows the second line 222 for 2 minutes after the output value reaches the set value.

As another example, if the proportional constant is 0.8 and the first time from the point of time when the control system starts to operate to the point of time when the output value reaches the set value is 2 minutes, the artificial intelligence unit 120 may perform reinforcement learning such that the output value follows the first line 221 for 2 minutes until the output value reaches the set value and the output value follows the second line 222 for 1 minute 36 seconds after the output value reaches the set value.

Fluctuation of the output value above or below the set value is a response to input of energy. As the amount of input energy is increased, a time when the output value fluctuates is increased.

For example, in the heating system, when the output value is from 25°C to a set value of 30°C, the first time Δt5 is increased and the amount of water for heating, which passes through the pipe by opening the valve, is increased as compared to the case where the output value is from 25°C to a set value of 26°C. Therefore, when the output value is from 25°C to a set value of 30°C, fluctuation of the temperature after the temperature reaches to the set value is continued for a longer time.

In the present invention, the first time Δt5 and the second time Δt6 are proportional. Accordingly, the present invention is advantageous in that reinforcement learning is performed after monitoring the output value for a longer time as the amount of input energy is increased, thereby calculating an optimal parameter.

Figure 6:
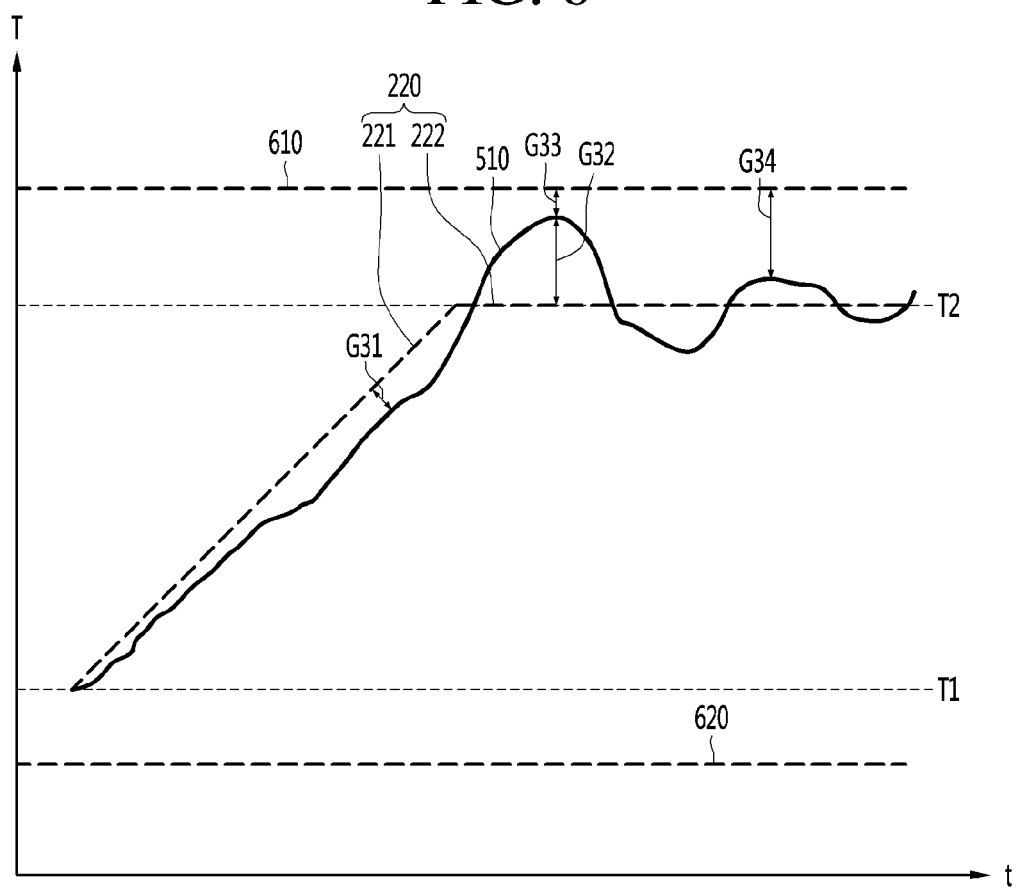
FIG. 6 is a diagram illustrating a method of setting an additional base line and performing reinforcement learning in order to avoid the additional base line according to an embodiment of the present invention.

FIG. 6 is a diagram illustrating a method of setting an additional base line and performing reinforcement learning in order to avoid the additional base line according to an embodiment of the present invention.

As described above, the base line 220 is ideal change of the output value according to control of the control system.

In contrast, the second base line 610 may mean an avoidance goal of avoiding the output value according to control of the control system.

For example, in the heating system, the second base line 610 may mean a specific temperature.

For example, in order to prevent the temperature to being increased to a specific temperature or more to prevent the user from feeling discomfort or to prevent the temperature to being increased to a specific temperature or more to prevent excessive power consumption, the second base line 610 may be set to a specific temperature. For example, the set value may be 30°C and the specific temperature may be 40°C.

In addition, the artificial intelligence unit 120 may perform reinforcement learning such that the output value follows the base line and avoids the second base line 610, thereby updating the control function for providing the control value to the control system. Here, avoiding the second base line may mean moving the output value according to control of the control system to be maximally away from the second base line 610.

Specifically, the artificial intelligence unit 120 may give a reward based on the gaps G31 and G32 between the base line 220 and the output value 510 and give a penalty based on the gaps G33 and G34 between the second base line 610 and the output value 510.

More specifically, as the gaps G31 and G32 between the base line 220 and the output value are decreased, the reward may be increased and, as the gaps G33 and G34 between the second base line 610 and the output value 510 are decreased, the penalty may be increased.

The artificial intelligence unit 120 may acquire one or more parameters for maximizing the sum of the reward and the penalty and change the parameter of the existing control function to a newly acquired parameter when the one or more parameters for maximizing the sum of the reward and the penalty are acquired, thereby updating the existing control function.

In this manner, the artificial intelligence unit 120 may continuously perform reinforcement learning, thereby acquiring an optimal parameter for enabling the output value according to control of the control system to follow the base line and to avoid the second base line.

In the present invention, the artificial intelligence agent may perform reinforcement learning based on various goals, by setting a plurality of base lines 220 and 610.

Specifically, if it is assumed that there is only a base line 220, an optimal parameter for enabling the output value to most closely follow the base line 220 is determined by an average of the gaps between the base line 220 and the output value 510 (that is, the area of a space between the output value and the base line). Accordingly, even when the average of the gaps is minimized, large overshoot may occur and thus the output value may approach a specific temperature causing an uncomfortable feeling to the user according to overshoot.

Accordingly, the present invention is advantageous in that the plurality of base lines 220 and 610 is set and the artificial intelligence agent learns the optimal parameter for enabling the output value to follow or avoid the base line, thereby calculating the optimal parameter capable of achieving various goals.

Meanwhile, although the two base lines 220 and 610 are set in the above description, the number of base lines is not limited thereto.

For example, in the air conditioning system, the base line 220, the second base line 610 and a third base line 630 may be set. The base line 220 may mean a temperature which the output value (the output temperature) follows, the second base line 610 is a high temperature (e.g., 40°C) which the output value (the output temperature) avoids, and the third base line 620 may mean a low temperature (e.g., 15°C) which the output value (the output temperature) avoids. Therefore, the artificial intelligence unit 120 may calculate an optimal parameter for enabling the temperature according to control of the air conditioning system to follow the base line in a range of 15°C to 40°C.

Meanwhile, as the gaps G31 and G32 between the base line 220 and the output value 510 are decreased, the reward is increased and, as the gaps G33 and G34 between the second base line 610 and the output value 510 are decreased, the penalty is increased. In this case, the magnitude of the penalty may be greater than that of the reward.

For example, when the gap between the base line 220 and the output value 510 is 10 and the gap between the second base line 610 and the output value 510 is 10, the reward of 5 may be given to the gap between the base line 220 and the output value 510 and the penalty of 10 may be given to the gap between the base line 610 and the output value 510.

The specific temperature indicated by the second base line may be a threshold which the output value should not exceed. Accordingly, in the present invention, by differentiating the magnitudes of the reward and the penalty, a higher weight is given to a goal of avoiding the specific temperature indicated by the second base line 610 than a goal of following the base line 220.

Figure 7:
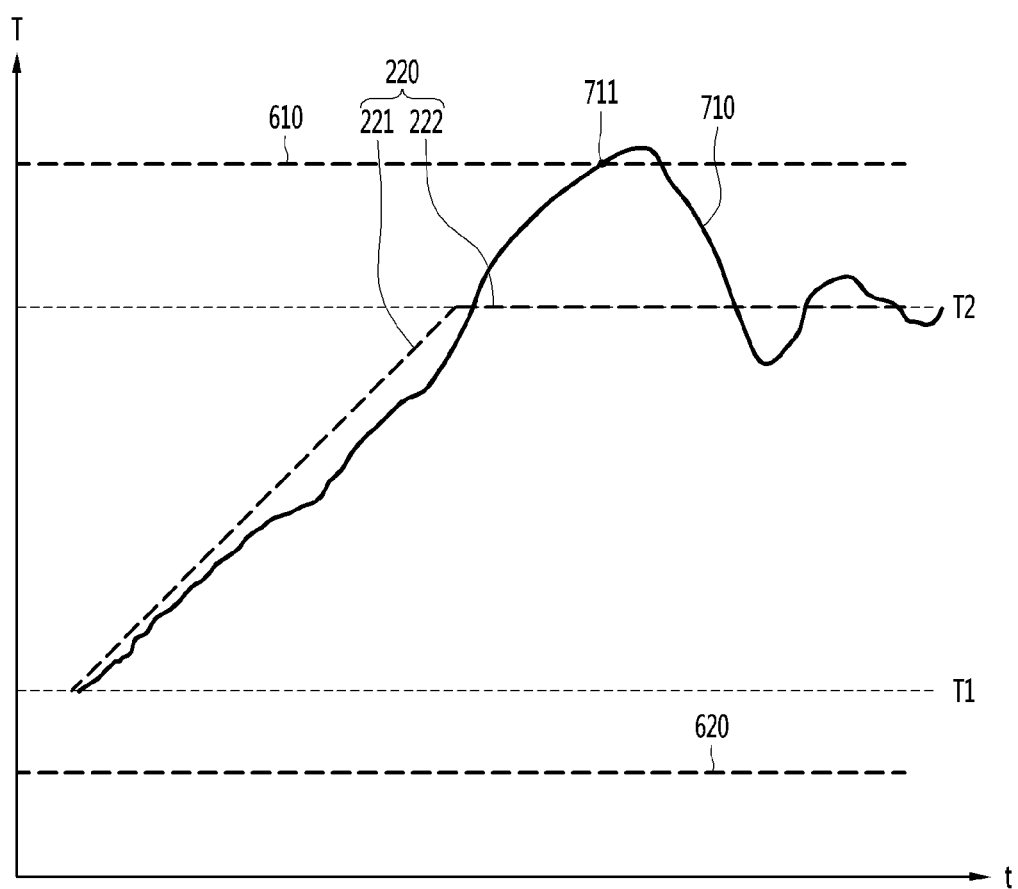
FIG. 7 is a diagram illustrating a method of discarding a parameter when an output value matches one point on a second base line according to an embodiment of the present invention.

FIG. 7 is a diagram illustrating a method of discarding a parameter when an output value matches one point on a second base line according to an embodiment of the present invention.

Even when reinforcement learning is performed such that the output value follows the base line 220 and avoids the second base line, there is still a possibility that the output value approaches the second base line 610, and the output value may reach the second base line 610.

Meanwhile, the value indicated by the second base line may be a threshold which the output value should not exceed.

Accordingly, the artificial intelligence unit 120 may discard the parameter of the control function for providing the control value to the control system, when the output value matches one point 711 on the second base line 610. In addition, the artificial intelligence unit 120 may not use the discarded parameter as the parameter of the control function.

Figure 8:
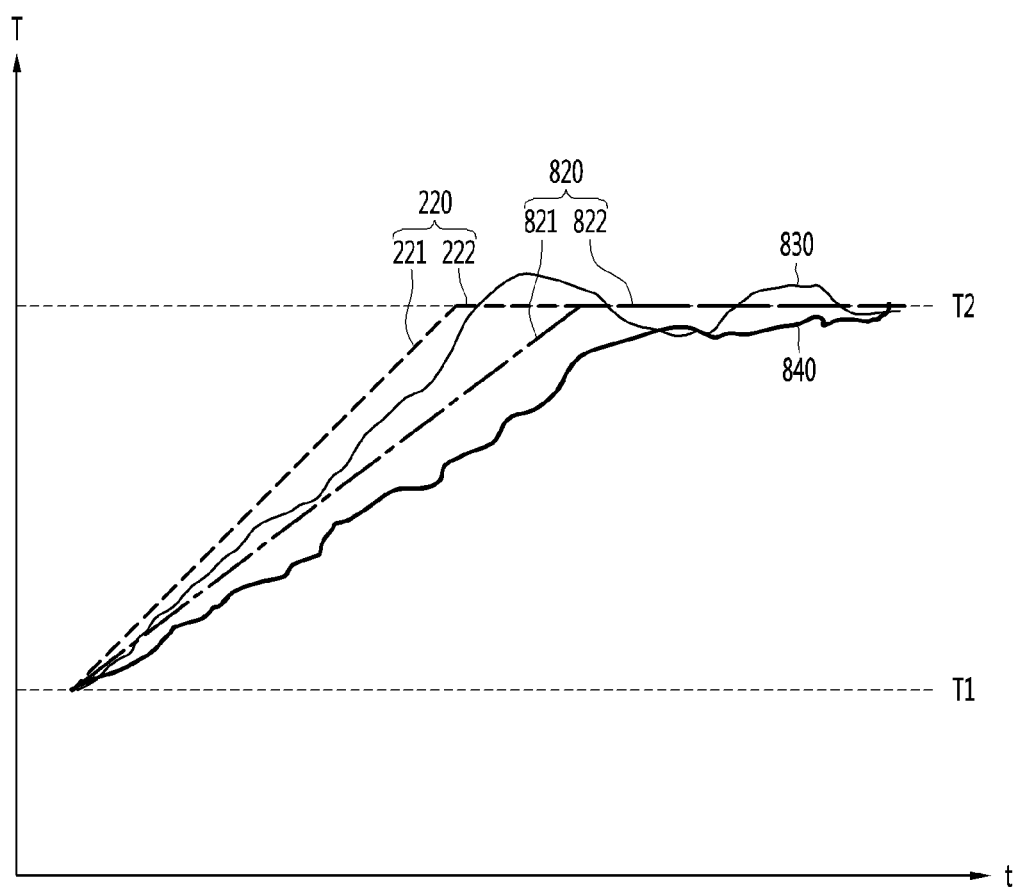
FIG. 8 is a diagram illustrating a method of resetting a base line according to change in environmental condition according to an embodiment of the present invention.

FIG. 8 is a diagram illustrating a method of resetting a base line according to change in environmental condition according to an embodiment of the present invention.

The artificial intelligence unit 120 may reset the base line according to change in environmental condition.

The environmental condition may be an external factor for changing the object to be controlled by the control system. In other words, the object to be controlled by the control system may be changed by a factor other than control of the control system, and the factor may be referred to as the environmental condition.

For example, if the control system is a heating system, the object to be controlled by the heating system is a temperature. The temperature may be changed not only by control of the heating system but also by time, date, season, weather, etc. In this case, the environmental condition may be time, date, season, weather, etc.

As described above, the first line 221 of the base line 220 indicates ideal change of the output value according to control of the control system and means change in output value according to maximum control of the control system.

Meanwhile, ideal change of the output value according to control of the control system may be changed according to change in environmental condition.

For example, even when the valve of the heating system is opened by the same degree, the rate of change of the output value (temperature) of summer and the rate of change of the output value (temperature) of winter may be different from each other.

Accordingly, the optimal parameter calculated in summer by performing reinforcement learning after setting change in output value according to maximum control of the control system to the base line 221 may be different from the optimal parameter applied in winter.

Accordingly, the artificial intelligence unit 120 according to the embodiment of the present invention may reset the base line 220 according to change in environmental condition.

Specifically, the collection unit 110 may directly acquire the output value or receive the output value from the outside.

In addition, the artificial intelligence unit 120 may sense change in output value. In this case, change in output value may mean change in output value irrespective of control of the control system, instead of change in output value according to control of the control system.

When change in output value is sensed, the artificial intelligence unit 120 may control the control system to perform maximum control.

In addition, while the control system performs maximum control, the artificial intelligence unit 120 may acquire the output value according to maximum control of the control system. In addition, the artificial intelligence unit 120 may set a first line 821 of a new base line 820 based on the acquired output value.

When the first line 821 of the new base line 820 is set, the artificial intelligence unit 120 may perform reinforcement learning such that the output value according to control of the control system follows the new base line 820.

The first output value 830 shown in FIG. 8 indicates an output value obtained by performing reinforcement learning in order to follow the existing base line 220 to acquire an optimal control function and to perform control using a control value provided by the acquired control function.

The second output value 840 shown in FIG. 8 indicates an output value obtained by performing reinforcement learning in order to follow the new base line 820 to acquire an optimal control function and to perform control using a control value provided by the acquired control function.

As the environmental condition is changed by season, date or the other variables, an optimal PID parameter suitable for the current environmental condition may be changed. However, conventionally, since the parameter is set through human intuition and experience, it is impossible to appropriately optimize the parameter in correspondence with change in environmental condition.

However, the present invention is advantageous in that the base line is changed when the environmental condition is changed and reinforcement learning is performed again in order to follow the changed base line, thereby optimizing the parameter in correspondence with change in environmental condition.

Figure 9:
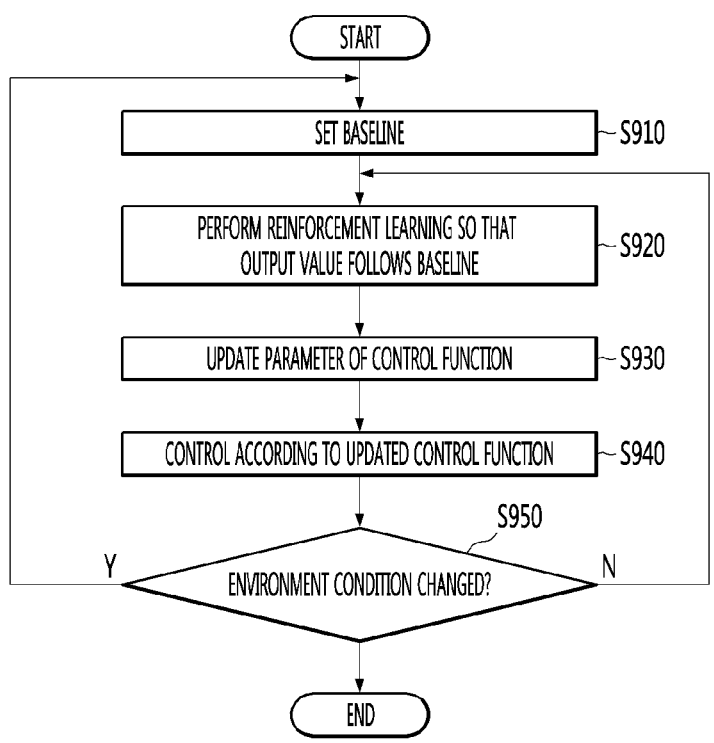
FIG. 9 is a flowchart illustrating an operation method of an artificial intelligence device and a control system according to an embodiment of the present invention.

FIG. 9 is a flowchart illustrating an operation method of an artificial intelligence device and a control system according to an embodiment of the present invention.

The artificial intelligence unit 120 may set the base line (S910).

Specifically, the artificial intelligence unit 120 may control the control system to perform maximum control.

In addition, the artificial intelligence unit 120 may set the base line according to the output value acquired while the control system performs maximum control.

When the base line is set, the artificial intelligence unit 120 may perform reinforcement learning such that the output value according to control of the control system follows the base line (S920).

Specifically, the artificial intelligence unit 120 may variously change the parameter of the control function and provide the control function with the changed parameter to the control system.

In this case, the control system may perform control according to the control function received from the artificial intelligence unit 120.

Specifically, the control system may input the current value and the set value to the control function received from the artificial intelligence unit 120, thereby calculating the control value. In addition, the control system may perform control according to the calculated control value.

In this case, the artificial intelligence unit 120 may acquire the output value according to control of the control system.

In addition, the artificial intelligence unit 120 may acquire the parameter for mostly closely following the base line using the acquired output value and the parameter used to acquire the output value.

Meanwhile, the artificial intelligence unit 120 may update the parameter of the control function (S930).

Specifically, when the parameter for most closely following the base line is acquired, the artificial intelligence unit 120 may change the existing control function to a control function including the newly acquired parameter.

Meanwhile, the control system may perform control according to the updated control function (S940).

That is, since the parameter for most closely following the base line is acquired through reinforcement learning, the control system may perform control according to the updated control function.

Meanwhile, when the environmental condition is not changed (S950), the artificial intelligence unit 120 may repeat S920 to S940 to continuously repeat the process of finding the optimal parameter based on the same base line.

Meanwhile, when the environmental condition is changed (S950) (or when change in environmental condition is equal to or greater than a predetermined value), the artificial intelligence unit 120 may reset the base line (S910). In addition, the artificial intelligence unit 120 may repeat S920 to S940 to continuously repeat the process of finding the optimal parameter based on the newly set base line.

Figure 10:
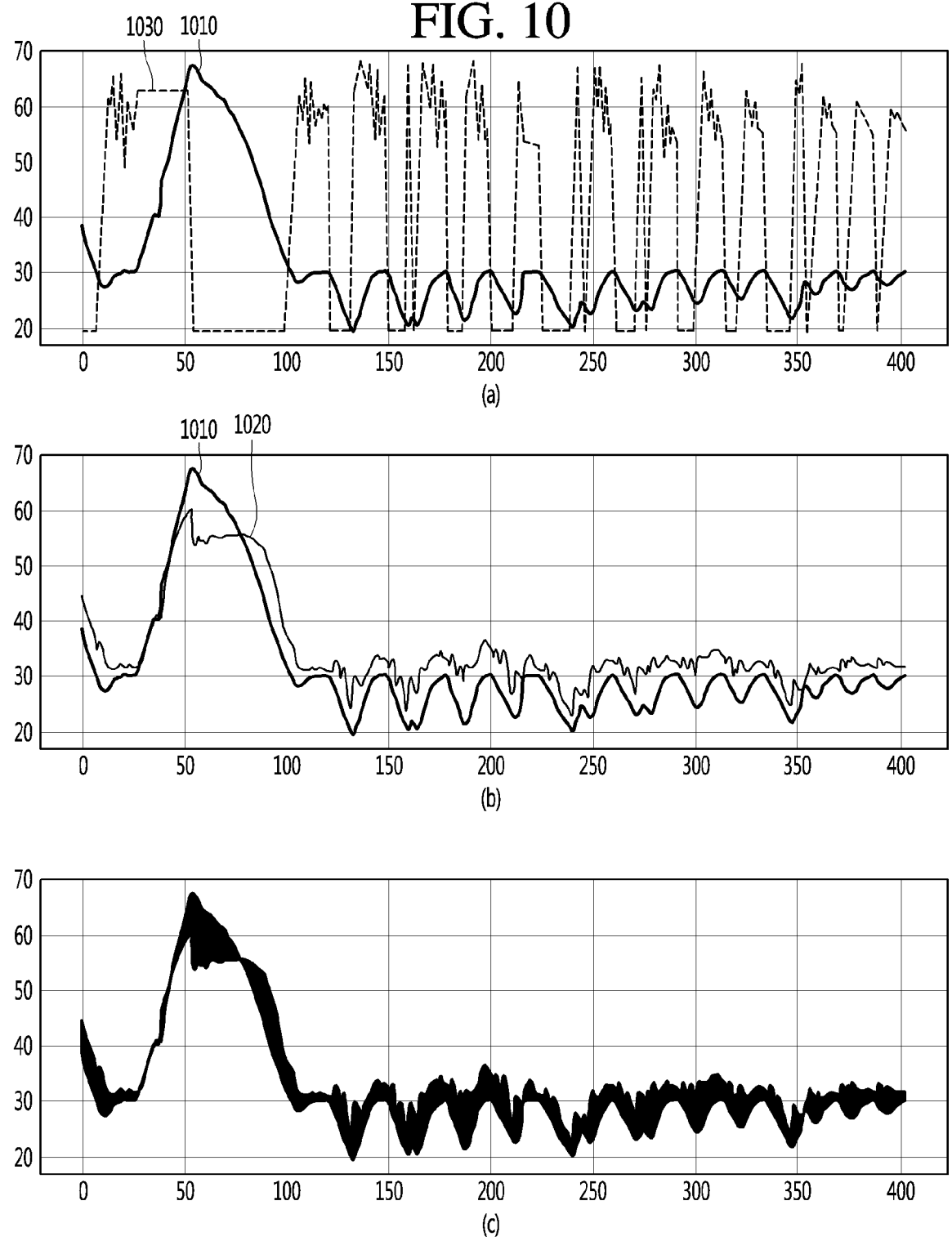
FIG. 10 is a diagram illustrating a method of pre-learning a pattern of an output value according to an embodiment of the present invention.

FIG. 10 is a diagram illustrating a method of pre-learning a pattern of an output value according to an embodiment of the present invention.

The pattern of the output value may mean change in output value according to control of the control system.

For example, the pattern of the output value in the heating system may indicate how the temperature according to control of the heating system is changed when the valve is opened by a predetermined degree.

Meanwhile, change in output value according to control of the control system may mean that a current behavior (that is, current control) affects a next step (output value) and a behavior at the next step (control using the current output value) affects a subsequent step (output value) thereof.

Accordingly, the artificial intelligence unit 120 may learn the pattern of the output value using a recurrent neural network (RNN) for learning data changed over time, such as time-series data. In this case, a long-short term memory (LSTM) method may be used.

Meanwhile, the artificial intelligence unit 120 may learn the control information of the control system and the output value according to the control information in an environment, in which the control system is installed, using the RNN.

Specifically, the data learned using the RNN may be time-series data of the control information and the output value according to the control information in the environment, in which the control system is installed.

For example, in the heating system, the data learned using the RNN may be time-series data of the temperature according to the degree of opening of the valve and the degree of opening of the valve in the environment, in which the heating system is installed.

In this case, the artificial intelligence unit 120 may learn data for a predetermined period using the RNN to acquire the pattern of the output value.

Meanwhile, the RNN may be included in the artificial intelligence unit 120 and the artificial intelligence unit 120 may directly acquire the pattern of the output value using the RNN, or an external device including the RNN may acquire the pattern of the output value and then the artificial intelligence device 100 may store the pattern of the output value in a storage unit.

FIG. 10a shows past control information (valve opening) 1030 and an output value (temperature) 1010 according to the control information at a specific place where the heating system is installed.

FIG. 10b shows the result that the artificial intelligence unit 120 learns the past control information (valve opening) 1030 and the output value (temperature) 1010 according to the control information at the specific place where the heating system is installed using the RNN and predicts temperature change 1020 based on the result of learning and current control information.

In FIG. 10c, the past temperature change 1010 and the predicted temperature change 1020 are substantially similar and the rate of concordance of 95.49% is achieved.

Figure 11:
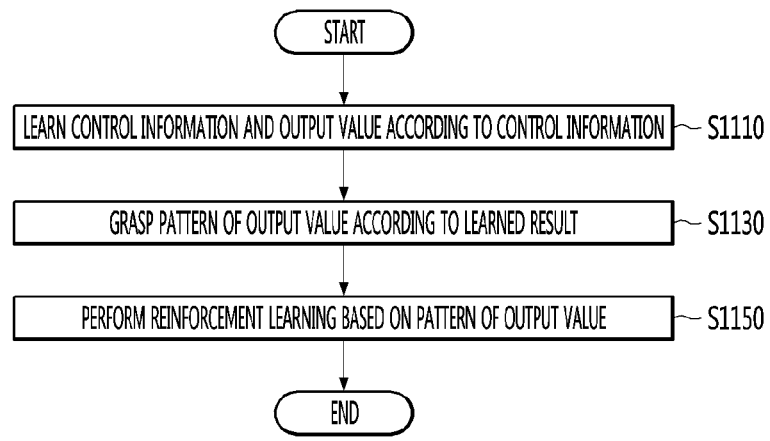
FIG. 11 is a flowchart illustrating a method of acquiring the pattern of an output value using a recurrent neural network and a method of performing reinforcement learning based on the pattern of the output value.

FIG. 11 is a flowchart illustrating a method of acquiring the pattern of an output value using a recurrent neural network and a method of performing reinforcement learning based on the pattern of the output value.

The artificial intelligence unit 120 may learn the control information of the control system and the output value according to the control information in the environment, in which the control system is installed, using the RNN (S1110).

Specifically, the artificial intelligence unit 120 may learn the control information and the output value of the control information in the environment, in which the control system is installed, for a considerable period.

For example, if the artificial intelligence unit 120 will be installed in the heating system of a building A, the artificial intelligence unit 120 may learn log data obtained by recording the control information of the heating system of the building A and the temperature according to the control information for one year using the RNN.

In this case, the artificial intelligence unit 120 may acquire the pattern of the output value according to the result of learning (S1130).

In addition, the artificial intelligence device, in which the result of learning is stored in the storage unit, may be connected to the control system to provide the control function to the control system to perform reinforcement learning.

In this case, the artificial intelligence unit 120 perform reinforcement learning based on the pattern of the output value (S1150).

Specifically, the artificial intelligence unit 120 may perform reinforcement learning while variously changing the parameter of the control function in a try and error manner.

In this case, the pattern of the output value may be provided as an environment provided to the agent in reinforcement learning.

That is, when the pattern of the output value is not learned using the RNN, since the output value is the environment provided to the agent, it is possible to increase a time required to perform reinforcement learning.

However, when the pattern of the output value is pre-learned using the RNN, since the pattern of the output value is provided to the agent as the environment, it is possible to remarkably decrease the time required to perform reinforcement learning.

In particular, when the artificial intelligence device 100 will be sold and installed at a specific place, the seller of the artificial intelligence device 100 may obtain and pre-learn the log data of the specific place and install the artificial intelligence device 100. Therefore, it is possible to remarkably improve a reinforcement learning speed.

Meanwhile, the pattern of the output value may be updated.

For example, the artificial intelligence device 100 may learn the control information and the output value according to the control information for last one year in the environment, in which the control system is installed, through the recurrent neural network, thereby acquiring the pattern of the output value.

As another example, the pattern of the output value acquired by learning the control information and the output value according to the control information for last one year in the environment, in which the control system is installed, through the recurrent neural network may be stored in the artificial intelligence device 100.

In this case, the artificial intelligence unit 120 may periodically update the pattern of the output value. For example, on Jul. 1, 2018, the log data from Jul. 1, 2017 to Jun. 30, 2018 may be learned and the pattern of the output value may be updated and, on Aug. 1, 2018, the log data from Aug. 1, 2017 to Jul. 30, 2018 may be learned and the pattern of the output value may be updated.

The pattern of the output value may be changed over time. For example, the weather gradually gets warmer due to global warming, or heating performance gets worse due to sediment in a heating pipe.

The present invention is advantageous in that the speed of reinforcement learning can be improved, by learning the latest data of the same period, grasping the pattern of the output value suitable for the current situation, and performing reinforcement learning.

Figure 12:
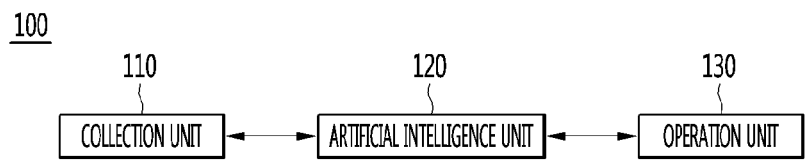
FIG. 12 is a diagram showing an artificial intelligence device configured by combining a control system, a collection unit and an artificial intelligence unit according to an embodiment of the present invention.

FIG. 12 is a diagram showing an artificial intelligence device configured by combining a control system, a collection unit and an artificial intelligence unit according to an embodiment of the present invention.

The artificial intelligence device 100 may include a collection unit 120, an artificial intelligence unit 110 and an operation unit 130.

For the collection unit 120 and the artificial intelligence unit 110, refer to the collection unit and the artificial intelligence unit of FIG. 1.

Although not shown, the artificial intelligence device 100 may include a storage unit. The storage unit may store a control function, a pattern of an output value, an application program for reinforcement learning, and an application program for learning time-series data using a recurrent neural network.

Meanwhile, the operation unit 130 may include components according to the function of the control system.

Specifically, the control system may mean all systems for collecting a current value, outputting a control value using the collected current value, a set value and a control function and performing control according to the output control value, such as an air conditioning system, an energy management system, a motor control system, an inverter control system, a pressure control system, a flow rate control system, a heating/cooling system, etc.

If the control system is a heating system, the collection unit 120 may include a temperature sensor. A operation unit 130 may include a valve for controlling flow of water for heating and a device for controlling the degree of opening of the valve under control of the artificial intelligence unit 110.

In this case, the artificial intelligence unit 120 may control the operation unit 130 to perform maximum control (open the valve by 100%) and set the base line using the output value acquired when maximum control is performed.

In addition, the artificial intelligence unit 120 may input a current temperature and a target temperature to a control function to output a control value, open the valve according to the output control value, and perform reinforcement learning such that the temperature acquired by opening the valve follows the base line.

The artificial intelligence unit may update the parameter of the control function according to the result of reinforcement learning.

Figure 13:
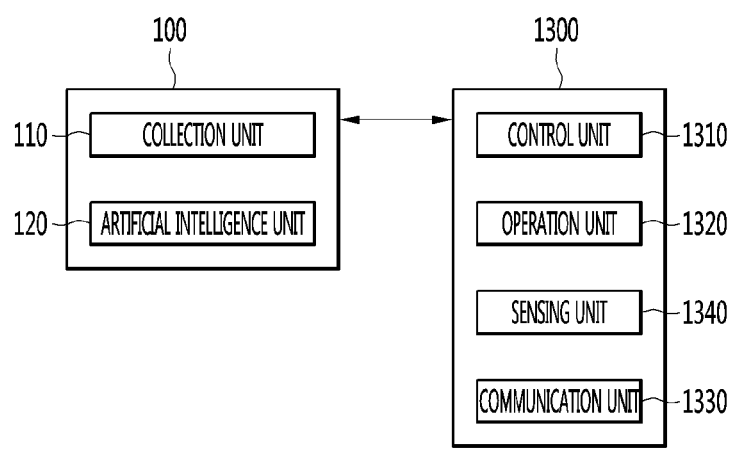
FIG. 13 is a block diagram illustrating an embodiment in which a control system and an artificial intelligence device are separately configured and the artificial intelligence device collects an output value according to an embodiment of the present invention.

FIG. 13 is a block diagram illustrating an embodiment in which a control system and an artificial intelligence device are separately configured according to an embodiment of the present invention.

The artificial intelligence device 100 may include a collection unit 110 and an artificial intelligence unit 120.

For the collection unit 110 and the artificial intelligence unit 120, refer to the collection unit and the artificial intelligence unit of FIG. 1.

Although not shown, the artificial intelligence device 100 may include a storage unit. The storage unit may store a control function, a pattern of an output value, an application program for reinforcement learning and an application program for learning time-series data using a recurrent neural network.

Meanwhile, a control system 1300 may include a controller 1310, an operation unit 1320, a communication unit 1330 and a sensing unit 1340.

Although not shown, the control system 1300 may include a storage unit. The storage unit may store an application program for driving the operation unit 1320, a control function, etc.

The sensing unit 1340 may sense the output value according to control of the control system.

The controller 1310 may control overall operation of the control system 1300.

Meanwhile, the communication unit 1330 of the control system 1300 and the collection unit 120 of the artificial intelligence device 100 may be connected to each other to perform communication with each other.

The artificial intelligence unit 110 may transmit a control command for enabling the operation unit 130 to perform maximum control (open the valve by 100%) to the control system 1300 through the collection unit 120.

In this case, the controller 1310 may perform maximum control and transmit, to the artificial intelligence device 100, the output value acquired when maximum control is performed.

In this case, the artificial intelligence unit 110 may set the base line using the output value acquired when the control system 1300 performs maximum control.

The controller 1310 may perform control based on the control value provided by the control function.

Specifically, the controller 1310 may input a current value and a set value to a control function to output a control value, perform control according to the output control value, and sense the output value obtained by performing control through the sensing unit 1340. When the output value is sensed, the controller 1310 may input the sensed output value and the set value to the control function to output the control value, perform control according to the output control value and sense the output value obtained by performing control through the sensing unit 1340.

That is, the controller 1310 may perform a general control loop feedback mechanism.

The controller 1310 may transmit the control information of the control system and the output value sensed by the sensing unit 1340 to the artificial intelligence unit 100 through the communication unit 1330.

Meanwhile, the artificial intelligence unit 110 may perform reinforcement learning such that the output value according to control of the control system 1300 follows the base line.

When a new parameter needs to be learned, the artificial intelligence unit 110 may transmit the control function including the new parameter to the control system 1300. In this case, the control system 1300 may perform control using the received control function, sense the output value according to control of the control system 1300, and transmit the output value to the artificial intelligence device 100.

Meanwhile, when a new parameter is acquired according to the result of reinforcement learning, the artificial intelligence unit 110 may update the existing control function to a control function including a new parameter. The artificial intelligence unit 110 may transmit the updated control information to the control system 1300.

In this case, the control system 1300 may perform control using the updated control function.

Figure 14:
FIG. 14 is a block diagram illustrating an embodiment in which artificial intelligence devices respectively corresponding to a plurality of control systems are integrally configured in a control center according to an embodiment of the present invention.

FIG. 14 is a block diagram illustrating an embodiment in which artificial intelligence devices respectively corresponding to a plurality of control systems are integrally configured in a control center according to an embodiment of the present invention.

For example, the control center 1500 may be a device for integrally managing heating systems of a specific building. A first control system 1600 may be a control device for controlling heating of a first space of the specific building and a second control system 1700 may be a control device for controlling heating a second space of the specific building.

The first control system 1600 may include a controller, an operation unit, a communication unit and a sensing unit. The description of the controller, the operation unit, the communication unit and the sensing unit shown in FIG. 13 is applicable without change, except that the communication unit communicates with the control center 1500.

In addition, the second control system 1700 may include a controller, an operation unit, a communication unit and a sensing unit. The description of the controller, the operation unit, the communication unit and the sensing unit shown in FIG. 13 is applicable without change, except that the communication unit communicates with the control center 1500.

The control center 1500 may include a collection unit and an artificial intelligence unit.

The description of the collection unit and the artificial intelligence unit shown in FIG. 13 is applicable to the collection unit and the artificial intelligence unit of the control center 1500 without change.

Meanwhile, the artificial intelligence unit of the control center 1500 may receive an output value according to control of the first control system 1600 from the first control system 1600 and update a first control function for providing a control value to the first control system 1600 based on reinforcement learning.

In addition, the artificial intelligence unit of the control center 1500 may receive an output value according to control of the second control system 1700 from the second control system 1700 and update a second control function for providing a control value to the second control system 1700 based on reinforcement learning.

In addition, the artificial intelligence unit of the control center 1500 may reset the base line of the first control system 1600 using an environmental condition acquired by the second control system 1700.

For example, when change in environmental condition is sensed according to the result of sensing by the sensing unit of the second control system 1700, the artificial intelligence unit of the control center 1500 may reset the base line of the first control system 1600.

That is, the sensed information acquired by the second control system may be used to update the control function of the first control system.

Although the PID is used as a control function in the above description, the present invention is not limited thereto.

For example, the control function may include one of proportional-integral (PI) control, proportional-derivative (PD) control and proportional-integral-derivative (PID) control.

In addition, the control function may include all types of functions for providing the control value to the control system in order to perform feedback control.

Meanwhile, a heating system, to which the present invention is applicable, will be described.

The artificial intelligence device according to the embodiment of the present invention may be included in the heating system.

The artificial intelligence device according to the embodiment of the present invention may include a collection unit, an operation unit and an artificial intelligence unit.

In this case, the collection unit may include a temperature sensor for sensing a temperature. Here, the temperature may be an output value according to temperature control of the heating system.

For example, the temperature sensor may be mounted in a room to be heated to sense the temperature of the room. In addition, when the heating system performs temperature control, the temperature sensor may sense the temperature of the room changed according to temperature control of the heating system.

Meanwhile, the operation unit may include a valve for controlling the flow rate of gas or liquid for temperature control of the heating system.

For example, the heating system may include a heating pipe for delivering gas or liquid to a room to be heated and a flow rate control valve mounted in the heating pipe to control the flow rate of gas or liquid. In addition, the heating system may include an operation unit (e.g., a motor) for controlling the opening degree of the valve.

Meanwhile, the artificial intelligence unit may update a control function based on reinforcement learning and control the opening degree of the valve according to a control value output from the updated control function.

Specifically, the artificial intelligence unit may perform reinforcement learning in order for the sensed temperature to follow a base line. In this case, the base line may include a first line indicating change in sensed temperature according to maximum control of the heating system.

For example, if a control value of 100 percent is output by the control function, the heating system may perform control corresponding to the control value of 100 percent, that is, control for opening the valve 100 percent. In this case, the first line may mean change in temperature of the room to be heated when the valve is opened 100 percent.

In addition, the base line may include a second line matching a target temperature which is a set value of the heating system.

Here, the second line may be a target value that the output value reaches when the heating system performs heating. For example, if the current temperature of the room to be heated is 24°C and a command for increasing the temperature to 30°C is received, the heating system may perform operation for increasing the temperature to 30°C. In this case, the artificial intelligence unit may set a base line including a first line indicating change in temperature at the time of maximum control of the heating system and a second line formed to match 30°C.

In addition, the artificial intelligence unit may perform reinforcement learning in order for the sensed temperature to follow the base line, thereby updating a control function.

In addition, the artificial intelligence unit may control the opening degree of the valve according to the control value output from the updated control function.

Specifically, in the heating system, the current value may be a current temperature and the set value may be a target temperature. In addition, the artificial intelligence unit may input a difference between the current value and the set value to calculate a control value. In addition, the artificial intelligence unit may control the opening degree of the valve according to the calculated control value.

Meanwhile, the artificial intelligence unit may perform reinforcement learning using a pattern of a temperature in an environment in which the heating system is mounted.

Here, the pattern of the temperature may indicate how the temperature of the room to be heated is changed when the valve is opened by a certain degree.

The pattern of the temperature may be acquired by learning the temperature according to the control information of the heating system and the control information of the environment, in which the heating system is mounted, by a recurrent neural network (RNN).

Specifically, data learned by the recurrent neural network (RNN) may be time-series data of the temperature according to the opening degree of the valve and the opening degree of the valve in the room to be heated.

In this case, the recurrent neural network (RNN) may acquire the pattern of the output value by learning data over a predetermined period of time. The learned recurrent neural network may be installed in a storage unit included in the artificial intelligence device.

Meanwhile, the artificial intelligence unit may be used interchangeably with a central processing unit, a microprocessor, a processor, etc.

The technique for controlling the feedback in the above-described manner may be called BONGSANG-PID.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks is configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

The DNN including a plurality of hidden layers between an input layer and an output layer may be a representative ANN which implements deep learning which is a kind of machine learning technology.

The term "deep learning" may be referred to as "deep learning".

The ANN may be trained by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN trained based on training data may classify or cluster input data, based on a pattern of the input data.

In this specification, an ANN trained based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be trained by receiving and using data which does not deceive the discriminator, and the discriminator may be trained by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

An artificial neural network may be specified in structure by a configuration of a model, an activation function, a loss function, or a cost function, a learning algorithm, an optimization algorithm, and the like. A hyperparameter may be set in advance before the learning, and then, a model parameter may be set through the learning to specify contents thereof.

For example, factors that determine the structure of the artificial neural network may include the number of hidden layers, the number of hidden nodes included in each of the hidden layers, an input feature vector, a target feature vector, and the like.

The hyperparameter includes various parameters that have to be initially set for learning such as an initial value of the model parameter. Also, the model parameter includes several parameters to be determined through the learning.

For example, the hyperparameter may include an initial weight value between the nodes, an initial deflection value between the nodes, a mini-batch size, the number of learning repetition, a learning rate, and the like. Also, the model parameter may include a weight between the nods, a deflection between the nodes, and the like.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function.

The loss function may mainly use a mean squared error (MSE) or a cross entropy error (CEE), but the present invention is not limited thereto.

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

Here, the step size may mean the learning rate.

In the GD, a gradient may be acquired by partially differentiating the loss function into each of the model parameters, and the model parameters may be updated by changing the model parameters by the learning rate in a direction of the acquired gradient.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

Figure 15:
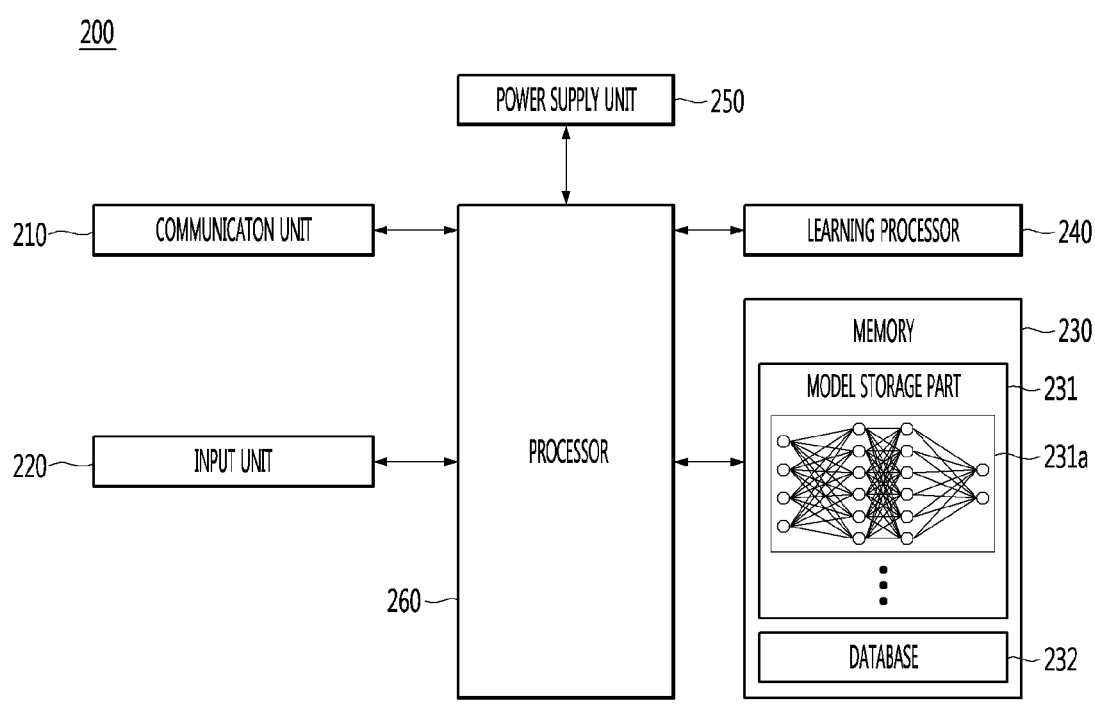
FIG. 15 is a block diagram illustrating a configuration of a learning device 200 of the artificial neural network according to an embodiment of the present invention.

FIG. 15 is a block diagram illustrating a configuration of the learning device 200 of the artificial neural network according to an embodiment of the present invention.

The learning device 200 may be configured to receive, classify, store, and output information to be used for data mining, data analysis, intelligent decision making, and machine learning algorithm. Here, the machine learning algorithm may include a deep learning algorithm.

The learning device 200 may communicate with an artificial intelligence device 100 and analyze or train the data instead of the artificial intelligence device 100 or by assisting the artificial intelligence device 100 to derive results. Here, the assisting for the other devices may mean distribution of computing power through distribution processing.

The learning device 200 for the artificial neural network may be a variety of apparatuses for learning an artificial neural network and may be generally called a server or called a learning device or a learning server.

Particularly, the learning device 200 may be implemented not only as a single server but also as a plurality of server sets, a cloud server, or a combination thereof.

That is, the learning device 200 may be provided in a plurality to constitute the learning device set (or the cloud server). At least one or more learning device 200 included in the learning device set may analyze or train data through the distribution processing to derive the result.

The learning device 200 may transmit the model that is learned by the machine learning or the deep learning to the artificial intelligence device 100 periodically or by demands.

Referring to FIG. 2, the learning device 200 may include a communication unit 210, an input unit 220, a memory 230, a learning processor 240, a power supply unit 250, a processor, 260, and the like.

The communication unit 210 may transmit and receive data to/from other devices through wired/wireless communication or an interface. For this, the communication unit 210 may include a communication circuit.

The input unit 220 may acquire training data for the model learning and input data to be used when an output is acquired using the trained model.

The input unit 220 may acquire input data that is not processed. In this case, the processor 260 or the learning processor 240 may preprocess the acquired data to generate training data that is capable of being inputted into the model learning or preprocessed input data.

Here, the preprocessing for the input data may mean extracting of an input feature from the input data.

The memory 230 may include a model storage part 231 and a database 232.

The model storage part 231 may store a model being learned or a learned model (or an artificial neural network 231a) through the learning processor 240 to store the updated model when the model is updated through the learning.

Here, the model storage part 231 may store the trained model into a plurality of versions according to a learning time point, a learning progress, and the like.

The artificial neural network 231a illustrated in FIG. 2 may be merely an example of the artificial neural network including a plurality of hidden layers, and the artificial neural network of the present invention is not limited thereto.

The artificial neural network 231a may be implemented as hardware, software, or a combination of the hardware and the software. When a portion or the whole of the artificial neural network 231a is implemented as the software, one or more commands constituting the artificial neural network 231a may be stored in the memory 230.

The database 232 may store the input data acquired by the input unit 220, the learning data (or the training data) used for the model learning, a learning history of the model, and the like.

The database 232 stored in the memory 232 may be input data itself, which is not processed, as well as data that is processed adequate for the model learning.

The learning processor 240 may train (or learn) the artificial neural network 231a by using the training data or the training set.

The learning processor 240 may directly acquire the processed data of the input data acquired through the input unit 220 to train the artificial neural network 231a or acquire the processed input data stored in the database 232 to train the artificial neural network 231a.

Particularly, the learning processor 240 may determine optimized model parameters of the artificial neural network 231a by repeatedly learning the artificial neural network 231a by using the above-described various learning techniques.

In this specification, since the artificial neural network is learned by using the training data, the artificial neural network of which the parameters are determined may be called a learned model or a trained model.

Here, the trained model may infer a result value in a state in which the trained model is installed on the learning device 200 or may be transmitted to the other device such as the terminal 100 through the communication unit 210 so as to be mounted.

Also, when the trained model is updated, the updated trained model may be transmitted to the other device such as the artificial intelligence device 100 through the communication unit 210 so as to be mounted.

The power supply unit 250 may receive external power and internal power under the control of the processor 260 to supply the power to each of the components of the learning device 200.

Also, functions performed by the learning processor 240 may be performed by the processor 260.

The term "learning device 200" may be used interchangeably with the term "apparatus 200 for generating a temperature prediction model".

Figure 16:
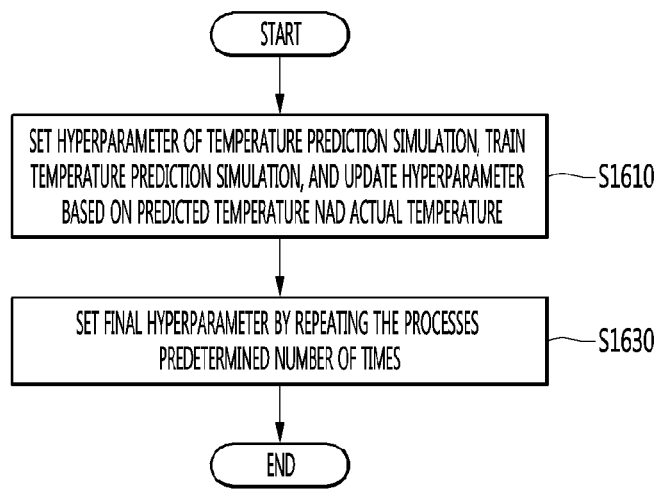
FIG. 16 is a view for explaining a method for providing a simulation environment according to an embodiment of the present invention.

FIG. 16 is a view for explaining a method for providing a simulation environment according to an embodiment of the present invention.

Referring to FIG. 16, a method for providing a simulation environment may include a process (S1610) of setting a hyperparameter of a temperature prediction model, training the temperature prediction model, in which the hyperparameter is set, so that the temperature prediction model outputs a predicted temperature, and updating the hyperparameter on the basis of a difference between the predicted temperature, which is outputted from the trained temperature prediction model, and an actual temperature; and a process (S1630) of repeating the setting of the hyperparameter, the training of the temperature prediction model, and the updating of the hyperparameter on the basis of the difference between the predicted temperature and the actual temperature by a predetermined number of times or more to set a final hyperparameter of the temperature prediction model.

A method of generating the temperature prediction model will be described in detail with reference to FIG. 17.

Figure 17:
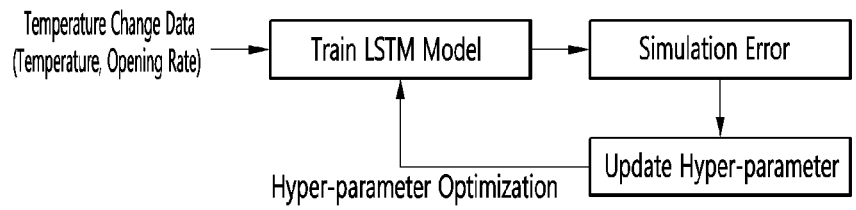
FIG. 17 is a view for explaining a method for generating a temperature prediction model according to an embodiment of the present invention.

FIG. 17 is a view for explaining a method for generating a temperature prediction model according to an embodiment of the present invention.

First, a temperature prediction model will be described. Here, the temperature prediction model may represent an artificial neural network that is to be trained, is trained, or is completely trained to predict a temperature.

The term "temperature prediction model" may be used interchangeably with the term "temperature prediction simulator".

The temperature prediction model may provide a simulation environment to an artificial intelligence device 100.

Particularly, an artificial intelligence unit 120 of the artificial intelligence device 100 may include a neural network.

Also, an environment in which an output value (temperature) is provided to update a control function is given to the neural network, a neural network behavior (adjusting valve opening and closing) is defined so that the output value (temperature) follows a baseline to achieve a goal, as the output value (temperature) by the neural network follows the baseline, a reward is given to the neural network, and the neural network is repeatedly learned until the reward is maximized to derive an optimal control function.

Also, the neural network that is to be trained, is trained, or completely trained to derive the optimal control function may be called a reinforcement learning model. As described above, the reinforcement learning model may be implemented as hardware, software, or a combination of the hardware and the software. When a portion or the whole of the reinforcement learning model is implemented as the software, one or more commands constituting the reinforcement learning model may be stored in the memory.

As described above, to train the neural network based on the reinforcement learning, the environment (output value (temperature)) according to the neural network behavior (degree of opening and closing of the valve) has to be given to the neural network.

Also, the temperature prediction model may provide the simulation environment, i.e., the output value according to the degree of opening/closing of the valve (or a pattern of the output value according to the degree of opening/closing of the valve) to the artificial intelligence device 100.

The temperature prediction model may be a recurrent neural network trained using time series data including control information and a temperature according to the control information. Here, the control information may represent an opening rate of the valve, i.e., the degree of opening and closing of the valve.

Particularly, a change of the output value according to the control of the control system causes the current behavior (i.e. the current control) to affect the next process (output value), and the action in the next process (control at the current output value) affects the process after the next process (output value).

Thus, the temperature prediction model may be constituted by a recurrent neural network (RNN) capable of learning and predicting data that changes over time, such as the time series data. Also, in recurrent neural network, a long-short term memory (LSTM) suitable for classification and approximation of the time series data may be used in the temperature prediction model.

The processor 260 of the apparatus 200 for generating the temperature prediction model may train the temperature prediction model so that the temperature prediction model predicts a temperature on the basis of the control information and the previous temperature.

Particularly, the processor 260 of the apparatus 200 for generating the temperature predictive model may input the time series data including the control information and the temperature according to the control information in the environment in which a control system is installed into the recurrent neural network (RNN) as training data.

For example, the processor 260 of the apparatus 200 for generating the temperature prediction simulator may input control information and temperature time series data of the temperature for a predetermined period (for example, one year) into the recurrent neural network (RNN) as the training data.

Here, the control information may be information about an amount of opening (opening rate) of the valve for the predetermined period (for example, one year) in the environment in which the artificial intelligence device 100 is installed, and the temperature may be a temperature for the predetermined period (for example, one year) in the environment in which artificial intelligence device 100 is installed. In this case, the temperature may vary depending on the opening of the valve and other variables (performance of the air conditioner, performance of the valve, building information (structure of the building, material of the building, the number of windows, thickness of a wall, etc.), season, date, time, etc.).

In this case, the temperature prediction simulator may be trained to predict the temperature based on the control information and the previous temperature.

Here, the previous temperature may represent a temperature between a current time and a previous time. For example, if the predetermined time is 4 minutes, and the temperature is collected in a unit of 30 seconds, the previous temperature is a temperature at −240 seconds, −210 seconds, −180 seconds, −150 seconds, −120 seconds, −90 seconds, −60 seconds, −30 seconds, and 0 second.

Also, the temperature prediction simulator may output the predicted temperature on the basis of the control information and the previous temperature. In this case, the processor 260 may compare the predicted temperature of the recurrent neural network to an actual temperature at the place, at which the artificial intelligence device is installed, to adjust (update) the model parameter of the recurrent neural network so that a difference between the predicted temperature and the actual temperature is small.

Also, the above-described processes may be repeated to set the model parameter of the recurrent neural network. Thus, the recurrent neural network may be trained to output the predicted temperature on the basis of the control information and the previous temperature. In this manner, the recurrent neural network in which the model parameter is set may be called a temperature prediction model.

As described above, the temperature prediction model generated using the time series data including the control information at the specific place and the temperature according to the control information may provide the simulation environment into the artificial intelligence device that establishes a policy for updating a control function for the same place (specific place).

Next, a hyperparameter of the temperature prediction model will be described.

The hyperparameter may include at least one of the number of layers of the recurrent neural network (number of layers), the number of nodes of each layer of the recurrent neural network (number of nodes), the number of repeated learning (number of epochs), and a learning rate in which how much to reflect a newly learned contents, or a dropout rate which defines a rate of nodes that are not helpful for learning.

The accuracy of the artificial neural network is highly dependent on the hyperparameter. Thus, to obtain a good temperature prediction model, it is very important to set up an optimized hyperparameter.

In particular, according to the present invention, when the temperature prediction model predicts the temperature on the basis of the control information, the reinforcement learning model of the artificial intelligence device establishes a policy on the basis of the predicted temperature. That is, since the predicted temperature is given to the environment in reinforcement learning, it is important to create a highly accurate temperature prediction model so as to improve performance of the reinforcement learning model.

Thus, the apparatus for generating the temperature prediction model according to an embodiment of the present invention provides a new hyperparameter to the temperature prediction model and set an optimal hyperparameter in a manner of updating the hyperparameter based on a difference between the predicted temperature and the actual temperature of the temperature prediction model.

Particularly, the processor 260 may set the hyperparameter of the temperature prediction model. In the setting of the initial hyperparameter, any initial hyperparameter may be set in the temperature prediction model.

Also, the processor 260 may be trained so that the temperature prediction model in which the hyperparameter is set outputs the predicted temperature.

Particularly, the processor 260 may provide the time series data including the control information and the temperature according to the control information to the temperature prediction model so that the temperature prediction model in which the hyperparameter is set outputs the predicted temperature. In this case, the trained temperature prediction model may output the predicted temperature on the basis of the control information and the previous temperature.

The processor 260 may input control information for a predetermined period (for example, 7 hours) to the trained temperature prediction model. Here, the control information may be actual control information in the environment in which the control system is installed.

The temperature prediction model in which the hyperparameter is set and trained may output the predicted temperature on the basis of the control temperature and the previous temperature for the predetermined period (e.g., 7 hours). Here, the previous temperature may represent a temperature between a current time point (a time point corresponding to the control information) and a time point before the predetermined time.

The previous temperature at which the temperature prediction model is used for outputting the predicted temperature may be the previous predicted temperature that is previously outputted by the temperature prediction model, not the actual temperature in the environment in which the control system is installed.

Particularly, when the temperature prediction model starts to predict the temperature, there is no previous predicted temperature previously outputted by the temperature prediction model. Thus, when the temperature prediction model starts to predict the temperature, the processor 260 may provide the temperature prediction model with the actual temperature corresponding to the actual control information together with the actual control information.

For example, when the temperature prediction model predicts the temperature by using the control information and the temperature between the current time and 4 minutes ago, the processor 260 may provide the actual temperature that responds to the actual control information along with the actual control information between the current time and 4 minutes ago to the temperature prediction model. For example, the processor 260 may provide the actual control information and the actual temperature at −240 seconds, −210 seconds, −180 seconds, −150 seconds, −120 seconds, −90 seconds, −60 seconds, −30 seconds, and 0 seconds to the temperature prediction model.

In this case, the temperature prediction model may sequentially output predicted temperatures at 30 seconds, 60 seconds, 90 seconds, 120 seconds, 150 seconds, 180 seconds, 210 seconds, and 240 seconds.

After a predetermined time has elapsed, since the temperature prediction model starts the prediction of the temperature, the temperature prediction model may output the predicted temperature using the actual control information and the previous predicted temperature previously outputted by the temperature prediction model.

For example, if 240 seconds have elapsed, since the temperature prediction model starts to estimate the temperature, the temperature prediction model may output a predicted temperature by using the previous forecast temperature (predicted temperature at 30 seconds, 60 seconds, seconds, 120 seconds, 150 seconds, 180 seconds, 210 seconds, and 240 seconds) previously outputted by the temperature prediction model and the actual control information.

The processor may update the hyperparameter on the basis of the difference between the actual temperature corresponding to the actual control information for the predetermined period and the predicted temperature outputted based on the actual control information for the predetermined period.

For example, the processor 260 may change the hyperparameter set in the temperature prediction model into another hyperparameter on the basis of a difference between the actual temperature corresponding to an actual opening rate of the valve from 08:00 to 03:00 on Jan. 1, 2018 at the place where the control system is or will be installed and the predicted temperature outputted by the temperature prediction simulator on the basis of the actual opening rate of the valve from 08:00 to 03:00 on Jan. 1, 2018 at the place where the control system is or will be installed and the previous temperature.

Thus, one cycle is completed, and next cycle proceeds. The updated hyperparameter is called a second hyperparameter, and the next cycle will be described.

The processor 260 may set a second hyperparameter in the temperature prediction model.

Also, the processor 260 may be trained so that the temperature prediction model in which the second hyperparameter is set outputs the predicted temperature.

Particularly, the processor 260 may provide the time series data including the control information and the temperature according to the control information to the temperature prediction model so that the temperature prediction model in which the second hyperparameter is set outputs the predicted temperature. In this case, the trained temperature prediction model may output the predicted temperature on the basis of the control information and the previous temperature.

The processor 260 may input control information for a predetermined period to the trained temperature prediction model. Here, the control information may be actual control information in the environment in which the control system is installed.

The temperature prediction model in which the second hyperparameter is set and trained may output the predicted temperature on the basis of the control temperature and the previous temperature for the predetermined period. Here, the previous temperature may represent a temperature between a current time point (a time point corresponding to the control information) and a time point before the predetermined time.

The previous temperature at which the temperature prediction model is used for outputting the prediction temperature may be the previous prediction temperature that is previously outputted by the temperature prediction model, not the actual temperature in the environment in which the control system is installed.

The processor may update the hyperparameter on the basis of the difference between the actual temperature corresponding to the actual control information for the predetermined period and the predicted temperature outputted based on the actual control information for the predetermined period.

For example, the processor 260 may change the second hyperparameter set in the temperature prediction model into another hyperparameter on the basis of a difference between the actual temperature corresponding to an actual opening rate of the valve from 08:00 to 03:00 on Jan. 1, 2018 at the place where the control system is or will be installed and the predicted temperature outputted by the temperature prediction simulator on the basis of the actual opening rate of the valve from 08:00 to 03:00 on Jan. 1, 2018 at the place where the control system is or will be installed and the previous temperature.

The changing of the hyperparameter on the basis of the difference between the actual and predicted temperatures may represent the acquisition of an error by comparing the actual and predicted temperature to the predicted temperature and the assigning of a new hyperparameter that reduces the error between the actual and predicted temperature.

For example, the processor 260 may update the new hyperparameter for reducing the error of the predicted temperature outputted by the temperature prediction model on the temperature prediction module on the basis of the actual temperature corresponding to the actual opening rate of the valve from 08:00 to 03:00 on Jan. 1, 2018 and the actual opening rate of the valve from 08:00 to 03:00 on Jan. 1, 2018 when a specific hyperparameter is set.

Also, a loss function may be used to obtain the error by comparing the actual temperature to the predicted temperature. For example, the processor 260 may update the hyperparameter so that a mean squared error (MSE) between the predicted temperature and the actual temperature outputted by the temperature prediction model is reduced.

Also, the setting of the hyperparameter, the training of the temperature prediction model, and the update of the hyperparameter on the basis of the difference between the predicted temperature and the actual temperature are repeated a predetermined number of times, and the processor may set a final hyperparameter of the temperature prediction model.

The adjustment of the hyperparameters on the basis of the difference between the actual and predicted temperatures may be performed in all cycles, but is not limited thereto. In some cycles, the hyperparameter may be adjusted based on the difference between the actual and predicted temperatures, and in other cycles, the hyperparameter may be adjusted randomly.

Next, a method for updating the hyperparameter will be described.

The processor may update the hyperparameter on the basis of any one algorithm of bayesian optimization, reinforcement learning, and bayesian optimization & hyperband.

Here, bayesian Optimization is a manner of probabilistically calculating a value that is likely to give the best results each time whenever changing the value of the hyperparameter, and then select the next one. Thus, the processor 260 may probabilistically calculate the hyperparameter predicted to have a small difference between the real temperature and the predicted temperature on the basis of the difference between the real temperature and the predicted temperature, and set the calculated hyperparameter in the temperature prediction model. Also, the setting of the hyperparameter, the training of the temperature prediction model, and the update of the hyperparameter on the basis of the difference between the predicted temperature and the actual temperature are repeated a predetermined number of times, and the processor may set a final hyperparameter of the temperature prediction model.

The reinforcement learning is a manner of learning a policy that makes the difference between the actual and the predicted temperatures smaller. That is, the neural network for the reinforcement learning may be trained through behavior (setting of the hyperparameter) and reward (or penalty) for the difference between the predicted and actual temperatures. Thus, the neural network for the reinforcement learning establishes a policy that may minimize the difference between the predicted temperature and the actual temperature, and outputs the hyperparameter that may minimize the difference between the actual temperature according to the established policy.

The bayesian optimization & hyperband (bayesian optimization & hyperband) is a manner of setting an optimal hyperparameter by the probabilistic calculation method and random exploration of bayesian optimization. That is, the processor 260 may search for the final hyperparameter of the temperature prediction model by appropriately combining random exploration and random calculation on the basis of the difference between the predicted temperature and the actual temperature.

The processor 260 may repeat the setting of the hyperparameter, the training of the temperature prediction model, and the update of the hyperparameter on the basis of the difference between the predicted temperature and the actual temperature by a predetermined number of times to set a final hyperparameter of the temperature prediction model.

Here, the final hyperparameter may represent a hyperparameter in which the difference between the predicted temperature and the actual temperature outputted by the temperature prediction model trained under the preset conditions is minimized, for example, the minimum mean squared error (MSE) under the preset conditions is minimized.

Here, the preset condition may represent a search range of the hyperparameter.

Particularly, within the search range of the hyperparameter, the processor 260 may set the hyperparameter as the final hyperparameter so that the difference between the predicted temperature outputted by the trained temperature prediction model and the actual temperature is minimized.

For example, the hyperparameter ranges from 3 to 5 layers, 50 to 500 nodes for each layer, a learning rate from 0.2 to 0.8, and an interval of 0.1 (e.g. 0.2, 0.3, 0.4, 0.5, 0.6, 0.7, and 0.8), a drop ratio: 0.2 to 0.5 intervals, the number of repetition learning 400 to 600 times may be set by the user.

In this case, the processor 260 may acquire the hyperparameter so that the difference between the predicted temperature outputted by the trained temperature prediction model and the actual temperature is minimized within the set range, to set the obtained hyperparameter as the final hyperparameter.

Also, the preset condition may be a target value of the difference between the predicted temperature and the actual temperature outputted by the trained temperature prediction model.

Particularly, the processor 260 may set the hyperparameter as the final hyperparameter so that the difference between the predicted temperature outputted by the trained temperature prediction model and the actual temperature is smaller than the preset value (target value).

For example, the target value of the mean squared error (MSE) may be set to 0.2 by the user. In this case, when the mean squared error (MSE) of the predicted temperature and the actual temperature outputted by the trained temperature prediction model is smaller than 0.2, the processor 260 regards the mean squared error (MSE) to be less than 0.2. as the hyperparameter that has a minimum mean squared error (MSE). Thus, the processor 260 may set the hyperparameter that has a mean squared error (MSE) of less than 0.2 as the final hyperparameter.

It has been described that the hyperparameter includes at least one of the number of layers, the number of nodes for each layer, the number of repetition learning, the learning rate, or the drop rate.

Some elements of the hyperparameter may be a fixed value, and some elements of the hyperparameter may be a value in which the apparatus for generating the temperature prediction model should perform the searching.

For example, the number of nodes for each layer, the learning rate, and the drop rate of the hyperparameter may be set to the fixed value by the user, and the number of layers and the repetition learning number of the hyperparameters may be elements to be searched by the processor 260.

In this case, the processor 260 may update some other elements of the hyperparameter.

Particularly, the processor 260 may maintain the fixed value for some elements of the hyperparameter and update some other elements of the hyperparameter in the process of updating the hyperparameter.

Also, if some other factor is updated that minimizes the difference between the predicted temperature and the actual temperature, the processor 180 may set the final hyperparameter that includes some elements having the fixed values and some other updated elements.

Figure 18:
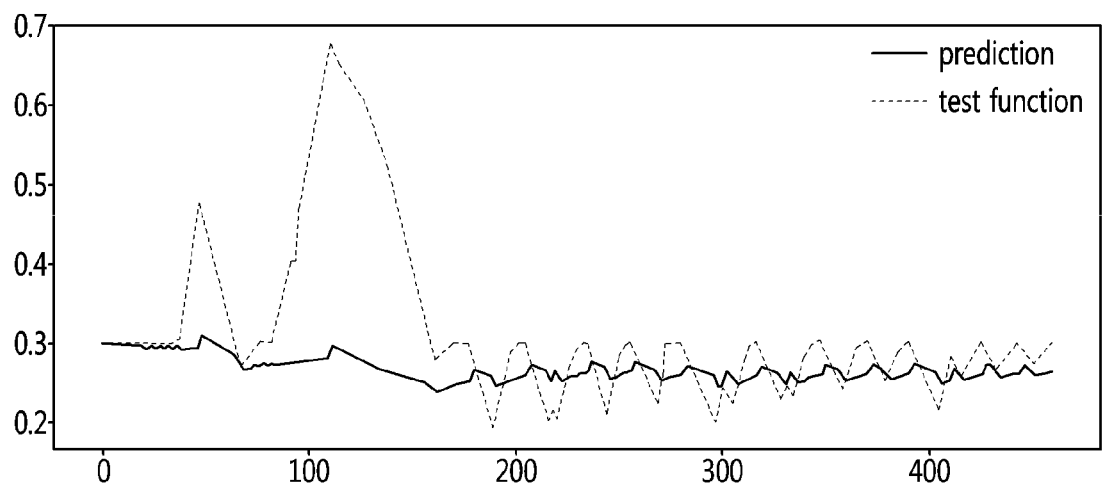
FIG. 18 is a view illustrating experiments of temperature prediction results of a temperature prediction model in which arbitrary initial hyperparameters are set.

FIG. 18 is a view illustrating experiments of temperature prediction results of a temperature prediction model in which an arbitrary initial hyperparameter is set.

A solid line is the predicted temperature outputted by the temperature prediction model in which the initial hyperparameter is set using the actual control information of the specific place and the previous temperature, and a dotted line is the actual temperature corresponding to the actual control information of the specific place.

Referring to FIG. 18, it may be seen that the difference between the predicted temperature and the actual temperature of the temperature prediction model in which an initial hyperparameter is set is very large.

When the hyperparameter is not optimized, the error is very large as the predicted temperature outputted by the temperature prediction model is used as an input value of the temperature prediction model again.

Figure 19:
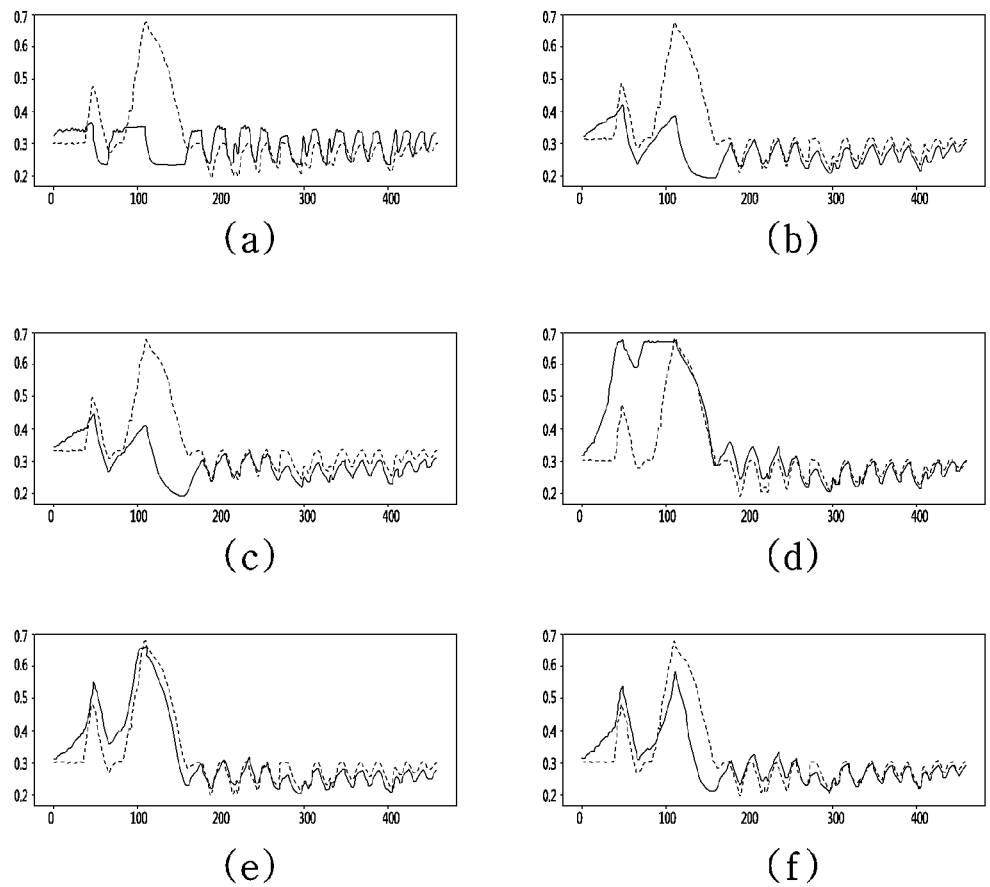
FIG. 19 is a view illustrating experiments of temperature prediction results of a temperature prediction model in which various hyperparameters are set.

FIG. 19 is a view illustrating experiments of temperature prediction results of the temperature prediction model in which various hyperparameters are set.

FIG. 19A illustrates results obtained by performing repeated learning 10 times using a single layer, FIG. 19B illustrates results obtained by performing repeated learning 100 times using a single layer, FIG. 19C illustrates results obtained by performing repeated learning 300 times using four layers, FIG. 19D illustrates results obtained by performing repeated learning 500 times using four layers, FIG. 19E illustrates results obtained by performing repeated learning 700 times using four layers, and FIG. 19F illustrates results obtained by performing repeated learning 900 times using four layers.

FIGS. 19E and 19F, when the hyperparameters are optimized, the difference between the predicted temperature and the actual temperature is significantly reduced compared to the graph of FIG. 18.

That is, through the optimizing of the hyperparameters, the accuracy of the prediction of the temperature prediction model may be significantly improved.

Also, it may be seen that as the number of layers increases and the number of iterations increases, the accuracy of the temperature prediction simulation improves.

However, the increasing the value of the hyperparameter does not necessarily improve the accuracy. For example, referring to FIGS. 19E and 19F, it may be seen that the accuracy of the predicted temperature (FIG. 19F) of the temperature prediction model, in which the hyperparameter is set, using four layers and 900 times is less than the accuracy the predicted temperature (FIG. 9E) of the temperature prediction model, in which the hyperparameter is set, using four layers and 700 times.

That is, it may be very difficult to search the hyperparameters that show the optimal simulation results, and when searching for hyperparameters based on the human intuition, it may be difficult to derive the optimal hyperparameter.

However, according to the present invention, since the apparatus for generating the temperature prediction model updates the hyperparameter by comparing the predicted temperature to the actual temperature of the temperature prediction model, there may be the advantage of deriving the optimal hyperparameter.

Also, according to the present invention, when the human provides only the control information and the actual temperature information at the specific place, the hyperparameters and model parameters of the temperature prediction model may be optimized by the apparatus for generating the temperature prediction model. Thus, there may be the advantage of significantly saving the time and effort while improving the accuracy of the temperature prediction model.

Also, according to the related art, the temperature prediction model may be generated by updating the equation indicating the relationship between the variables and the temperature. However, according to the present invention, the temperature change pattern itself, which depends on the variables (the performance of the air conditioner, the performance of the valve, the information of building (the structure of the building, the material of the building, the number of windows, the thickness of the wall, and the like). Therefore, according to the present invention, all the variables (the performance of the air conditioner, the performance of the valve, the information of building (the structure of the building, the material of the building, the number of windows, the thickness of the wall, and the like) may be reflected to improve the accuracy of the prediction.

In addition, according to the present invention, in the state in which some elements of the hyperparameters are fixed by the user's setting, the optimal value for some other elements may be derived. Thus, there may be the advantage that is capable of being optimized by specifying only the elements that are required by the user. For example, the user may set some elements of the hyperparameters as the fixed values depending on the intuition or the design convenience, and some of the other elements of the hyperparameter may be utilized for the apparatus for generating the temperature prediction model in the optimized manner.

Figure 20:
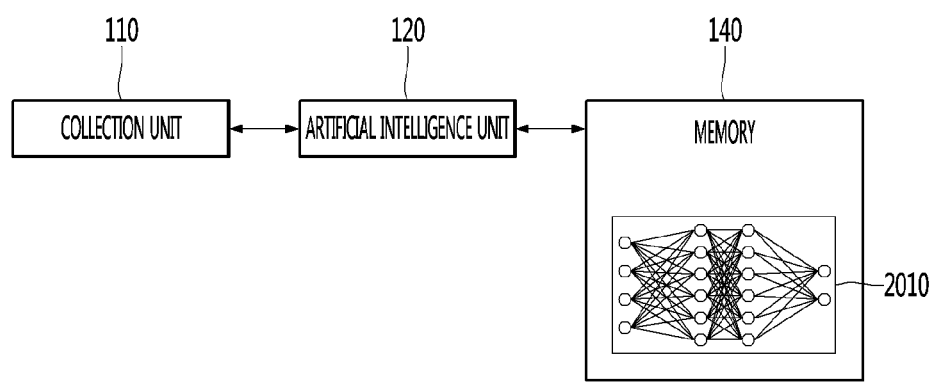
FIG. 20 is a view for explaining an example of using the temperature prediction model according to an embodiment of the present invention.

FIG. 20 is a view for explaining an example of using the temperature prediction model according to an embodiment of the present invention.

The temperature prediction model 2010 may be mounted on the artificial intelligence device 100.

Particularly, one or more instructions constituting the temperature prediction model 2010 may be stored in the memory 140 of the artificial intelligence device 100.

The artificial intelligence unit 120 of the artificial intelligence device 100 may update the parameter of the control function on the basis of the output value (temperature) according to the control function based on the reinforcement learning.

Particularly, an environment in which a temperature is provided to update the control function is given to the reinforcement learning model mounted in the artificial intelligence device 100, a behavior of the reinforcement learning model (adjusting a degree of opening/closing of the valve) is defined to follows a baseline, a reward is given to the reinforcement learning model to follow the baseline, and the reinforcement learning model is repeatedly learned until the reward is maximized to derive an optimal control function.

In this case, the temperature prediction model may provide a simulation environment.

Particularly, the temperature prediction model may provide the environment (temperature) given to the reinforcement learning model to the reinforcement learning model.

More particularly, when the reinforcement learning model outputs an action (degree of opening/closing of the valve), the artificial intelligence unit 120 may input the behavior of the reinforcement learning model (degree of opening/closing of the valve) to the temperature prediction model.

In this case, the temperature prediction model may output the predicted temperature on the basis of the behavior of the reinforcement learning model (degree of opening/closing of the valve) and the previous temperature. In this case, the artificial intelligence unit 120 may give the reward or the penalty to the reinforcement learning model on the basis of the predicted temperature outputted from the temperature prediction model and the gap of the baseline, and the reinforcement learning model may be updated based on the given reward or penalty.

As described above, according to the present invention, since the simulation environment for learning of the artificial intelligence device 100 is provided, the reinforcement learning model may be pre-trained, and the time required for reinforcement learning may be greatly reduced.

Particularly, when the artificial intelligence device 100 is to be sold and installed in a specific place, the seller of the artificial intelligence device 100 may obtain log data of the specific place to generate the temperature prediction model and then install the artificial intelligence device after being previously learned by using the temperature prediction model. Thus, There is an advantage that may greatly improve the speed of reinforcement learning.

Figure 21:
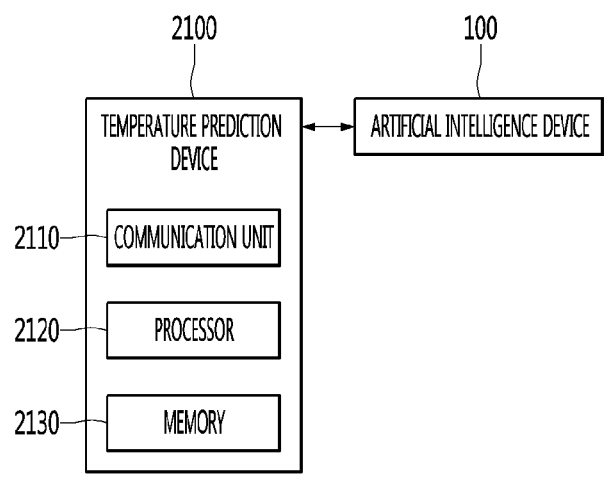
FIG. 21 is a view for explaining an example of using a temperature prediction model according to another embodiment of the present invention.

FIG. 21 is a view for explaining an example of using a temperature prediction model according to another embodiment of the present invention.

A temperature prediction model may be mounted on a temperature prediction apparatus 2100.

Particularly, one or more instructions constituting the temperature prediction model 2010 may be stored in the memory 2130 of the temperature prediction apparatus 2100. The temperature prediction apparatus 2100 may be the apparatus 200 for generating the temperature prediction model described above.

The processor 2120 of the temperature prediction apparatus 2100 may communicate with the artificial intelligence device 100 through the communication unit 2110.

When the reinforcement learning model outputs an action (degree of opening/closing of the valve), the artificial intelligence device 100 may transmit the behavior of the reinforcement learning model (degree of opening/closing of the valve) to the temperature prediction apparatus.

In this case, the processor 2120 of the temperature prediction apparatus 2100 may receive a degree of opening/closing of a valve and input the received degree of opening/closing of the valve into the temperature prediction model.

In this case, the temperature prediction model may output the predicted temperature on the basis of the behavior of the reinforcement learning model (degree of opening/closing of the valve) and the previous temperature. Also, the processor 2120 of the temperature predicting device 2100 may transmit the predicted temperature to the artificial intelligence device 100.

In this case, the artificial intelligence unit 120 may give the reward or the penalty to the reinforcement learning model on the basis of the prediction temperature outputted from the temperature prediction model and the gap of the baseline, and the reinforcement learning model may be updated based on the given reward or penalty.

Next, a method for providing the simulation environment will be described.

A method for providing a simulation environment includes a process of setting a hyperparameter of a temperature prediction model, training the temperature prediction model, in which the hyperparameter is set, so that the temperature prediction model outputs a predicted temperature, and updating the hyperparameter on the basis of a difference between the predicted temperature, which is outputted from the trained temperature prediction model, and an actual temperature and a process of repeating the setting of the hyperparameter, the training of the temperature prediction model, and the updating of the hyperparameter on the basis of the difference between the predicted temperature and the actual temperature by a predetermined number of times or more to set a final hyperparameter of the temperature prediction model.

In this case, the temperature prediction model may be a recurrent neural network that is trained by using time series data comprising control information and a temperature according to the control information so as to output the predicted temperature.

In this case, the updating of the hyperparameter may include a process of providing the time series data to the temperature prediction model in which the hyperparameter is set to train the temperature prediction model so that the temperature prediction model in which the hyperparameter is set outputs the predicted temperature, a process of inputting actual control information for a predetermined time period into the trained temperature prediction model, and a process of updating the hyperparameter on the basis of a difference between the actual temperature corresponding to the actual control information for the predetermined time period and the predicted temperature outputted based on the actual control information for the predetermined time period.

The process of setting the final hyperparameter of the temperature predication model may include a process of setting a hyperparameter, in which the difference between the predicted temperature outputted from the trained temperature prediction model and the actual temperature is minimized, as the final hyperparameter within a searching range of the hyperparameter.

The process of setting the final hyperparameter of the temperature predication model may include a process of setting a hyperparameter, in which the difference between the predicted temperature outputted from the trained temperature prediction model and the actual temperature is less than a preset value, to the final hyperparameter.

The method for providing the simulation environment may further include a process of inputting control information into the temperature prediction model, in which the final hyperparameter is set, to acquire the predicted temperature, and a process of allowing an artificial intelligence device to update, based on reinforcement learning, a control function on the basis of the predicted temperature corresponding to the control information.

The above-described present invention may be implemented as a computer-readable code on a computer-readable medium in which a program is stored. The computer readable recording medium includes all types of recording devices in which data readable by a computer system is stored. Examples of the computer-readable recording medium include hard disk drives (HDD), solid state disks (SSD), silicon disk drives (SDD), read only memories (ROMs), random access memories (RAMs), compact disc read only memories (CD-ROMs), magnetic tapes, floppy discs, and optical data storage devices. Also, the computer may include a control unit 180 of the terminal. Thus, the detailed description is intended to be illustrative, but not limiting in all aspects. It is intended that the scope of the present invention should be determined by the rational interpretation of the claims as set forth, and the modifications and variations of the present invention come within the scope of the appended claims and their equivalents.

The invention claimed is:

1. An apparatus for generating a temperature prediction model, the apparatus comprising:
the temperature prediction model configured to provide a simulation environment; and
a processor configured to:
set a hyperparameter of the temperature prediction model;
train the temperature prediction model, in which the hyperparameter is set, so that the temperature prediction model, in which the hyperparameter is set, outputs a predicted temperature;

update the hyperparameter on the basis of a difference between the predicted temperature outputted from the trained temperature prediction model, and an actual temperature; and repeat the setting of the hyperparameter, the training of the temperature prediction model, and the updating of the hyperparameter on the basis of the difference between the predicted temperature and the actual temperature by a predetermined number of times or more to set a final hyperparameter of the temperature prediction model, wherein the hyperparameter is updated based on a first condition and a second condition, the first condition is to update only a first element of the hyperparameter excluding a second element of the hyperparameter set to a fixed value by a user, and the second condition is to maintain the fixed value for the second element of the hyperparameter without updating the second element of the hyperparameter, and wherein the first element of the hyperparameter includes a number of layers and a number of times of repetition learning, the second element of the hyperparameter includes a number of nodes for each layer, a learning rate, and a drop rate, and the first element of the hyperparameter is searched by the processor when the second element of the hyperparameter is set to the fixed value by the user.

2. The apparatus according to claim 1, wherein the temperature prediction model is a recurrent neural network that is trained by using time series data comprising control information and a temperature according to the control information so as to output the predicted temperature.

3. The apparatus according to claim 2, wherein the processor is configured to:

provide the time series data to the temperature prediction model in which the hyperparameter is set to train the temperature prediction model so that the temperature prediction model in which the hyperparameter is set outputs the predicted temperature;

input actual control information for a predetermined time period into the trained temperature prediction model; and update the hyperparameter on the basis of a difference between the actual temperature corresponding to the actual control information for the predetermined time period and the predicted temperature outputted based on the actual control information for the predetermined time period.

4. The apparatus according to claim 1, wherein the processor is configured to set a hyperparameter, in which the difference between the predicted temperature outputted from the trained temperature prediction model and the actual temperature is minimized, to the final hyperparameter, within a searching range of the hyperparameter.

5. The apparatus according to claim 1, wherein the processor is configured to set a hyperparameter, in which the difference between the predicted temperature outputted from the trained temperature prediction model and the actual temperature is less than a preset value, to the final hyperparameter.

6. The apparatus according to claim 1, wherein the processor is configured to update the hyperparameter on the basis of any one algorithm of bayesian optimization, reinforcement learning, and bayesian optimization & hyperband.

7. The apparatus according to claim 1, wherein the temperature prediction model is configured to provide a simulation environment to an artificial intelligence device, and wherein the artificial intelligent device includes a neural network.

8. The apparatus according to claim 7, wherein the simulation environment includes outputting a value according to a degree of opening or closing of a valve.

9. A method for providing a simulation environment, the method comprising:

setting a hyperparameter of a temperature prediction model, training the temperature prediction model, in which the hyperparameter is set, so that the temperature prediction model, in which the hyperparameter is set, outputs a predicted temperature, and updating the hyperparameter on the basis of a difference between the predicted temperature outputted from the trained temperature prediction model, and an actual temperature; and repeating the setting of the hyperparameter, the training of the temperature prediction model, and the updating of the hyperparameter on the basis of the difference between the predicted temperature and the actual temperature by a predetermined number of times or more to set a final hyperparameter of the temperature prediction model, wherein the hyperparameter is updated based on a first condition and a second condition, the first condition is to update only a first element of the hyperparameter excluding a second element of the hyperparameter set to a fixed value by a user, and the second condition is to maintain the fixed value for the second element of the hyperparameter without updating the second element of the hyperparameter, and wherein the first element of the hyperparameter includes a number of layers and a number of times of repetition learning, the second element of the hyperparameter includes a number of nodes for each layer, a learning rate, and a drop rate, and the first element of the hyperparameter is searched by the processor when the second element of the hyperparameter is set to the fixed value by the user.

10. The method according to claim 9, wherein the temperature prediction model is a recurrent neural network that is trained by using time series data comprising control information and a temperature according to the control information so as to output the predicted temperature.

11. The method according to claim 10, wherein the updating of the hyperparameter comprises:

providing the time series data to the temperature prediction model in which the hyperparameter is set to train the temperature prediction model so that the temperature prediction model in which the hyperparameter is set outputs the predicted temperature;

inputting actual control information for a predetermined time period into the trained temperature prediction model; and updating the hyperparameter on the basis of a difference between the actual temperature corresponding to the actual control information for the predetermined time period and the predicted temperature outputted based on the actual control information for the predetermined time period.

12. The method according to claim 9, wherein the setting of the final hyperparameter of the temperature predication model comprises setting a hyperparameter, in which the difference between the predicted temperature outputted from the trained temperature prediction model and the actual temperature is minimized, as the final hyperparameter within a searching range of the hyperparameter.

13. The method according to claim 9, wherein the setting of the final hyperparameter of the temperature predication model comprises setting a hyperparameter, in which the difference between the predicted temperature outputted from the trained temperature prediction model and the actual temperature is less than a preset value, to the final hyperparameter.

14. The method according to claim 9, further comprising:
   inputting control information into the temperature prediction model, in which the final hyperparameter is set, to acquire the predicted temperature; and
   allowing an artificial intelligence device to update, based on reinforcement learning, a control function on the basis of the predicted temperature corresponding to the control information.

15. The method according to claim 9, wherein the temperature prediction model provides a simulation environment to an artificial intelligence device, and wherein the artificial intelligent device includes a neural network.

16. The method according to claim 15, wherein the simulation environment includes outputting a value according to a degree of opening or closing of a valve.

* * * * *